US012000293B1

(12) United States Patent
Humes et al.

(10) Patent No.: US 12,000,293 B1
(45) Date of Patent: Jun. 4, 2024

(54) SYSTEMS AND METHODS FOR MULTI-DIMENSIONAL VARIABLE VANE STAGE RIGGING UTILIZING COUPLING MECHANISMS

(71) Applicant: Rolls-Royce North American Technologies Inc., Indianapolis, IN (US)

(72) Inventors: Ryan Humes, Indianapolis, IN (US); Andrew Eifert, Indianapolis, IN (US); Paulo Bazan, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/091,894

(22) Filed: Dec. 30, 2022

(51) Int. Cl.
*F01D 17/16* (2006.01)

(52) U.S. Cl.
CPC ........ *F01D 17/162* (2013.01); *F05D 2260/53* (2013.01); *F05D 2260/56* (2013.01)

(58) Field of Classification Search
CPC ........ F01D 17/162; F01D 17/16; F01D 9/041; F01D 9/042; F01D 17/14; F01D 9/04; F01D 17/12; F01D 25/34; F01D 17/165; F01D 25/16; F01D 25/243; F01D 25/28; F01D 7/00; F04D 29/563; F04D 27/0246; F04D 27/002; F04D 29/644; F04D 29/321; F04D 29/323; F05D 2220/32; F05D 2260/56; F05D 2260/50; F05D 2240/12; F05D 2240/128; F05D 2260/53; F05D 2260/74; F05D 2250/90; F05D 2250/14; F05D 2230/64; F05D 2260/36; F05D 2260/532; F05D 2260/70; F05D 2250/294; F05B 2260/50
See application file for complete search history.

(56) References Cited

U.S. PATENT DOCUMENTS

| | | | | |
|---|---|---|---|---|
| 3,914,066 | A | 10/1975 | Downing | |
| 5,492,446 | A | 2/1996 | Hawkins et al. | |
| 5,692,879 | A | 12/1997 | Charbonnel | |
| 5,807,072 | A | 9/1998 | Payling | |
| 5,993,152 | A | 11/1999 | Schilling | |
| 6,769,868 | B2 | 8/2004 | Harrold | |
| 7,112,041 | B2 * | 9/2006 | Debeneix | F01D 17/162 415/162 |
| 7,413,401 | B2 * | 8/2008 | Szucs | F01D 17/162 415/162 |

(Continued)

*Primary Examiner* — Eric J Zamora Alvarez
(74) *Attorney, Agent, or Firm* — Barnes & Thornburg LLP

(57) ABSTRACT

A vane adjustment assembly includes vanes, an annular ring coupled to the vanes, and a ring adjustment assembly. The adjustment assembly includes a base frame mounted on the ring and including a support body having a first cavity, a first collar removably arranged within the first cavity and having a second cavity formed therein, a second collar removably arranged within the second cavity, and a roller pin coupled to the second collar. The second cavity is offset relative to the first collar and the roller pin is offset relative to the second collar. The first and second collars can be selectively arranged at rotational positions within the first and second cavities such that the roller pin can be positioned at distinct roller pin positions each corresponding to a rotational position of the first collar and a rotational position of the second collar.

19 Claims, 15 Drawing Sheets

(56) References Cited

U.S. PATENT DOCUMENTS

| | | | | |
|---|---|---|---|---|
| 8,177,490 | B2 * | 5/2012 | Bouru | F01D 17/162 415/150 |
| 8,297,918 | B2 | 10/2012 | Bhatnagar | |
| 8,333,546 | B2 | 12/2012 | Colotte et al. | |
| 8,393,857 | B2 | 3/2013 | Copeland et al. | |
| 8,727,697 | B2 * | 5/2014 | Eifert | F04D 29/563 415/1 |
| 8,784,043 | B2 * | 7/2014 | Bouru | F04D 29/563 92/128 |
| 9,353,643 | B2 | 5/2016 | Major | |
| 9,429,169 | B2 * | 8/2016 | Bouru | F04D 29/563 |
| 9,645,050 | B2 | 5/2017 | Allford | |
| 10,100,663 | B2 | 10/2018 | Longworth et al. | |
| 10,107,130 | B2 * | 10/2018 | Suciu | F01D 17/162 |
| 10,196,925 | B2 | 2/2019 | Siebert | |
| 10,288,079 | B2 | 5/2019 | Skertic | |
| 10,301,962 | B2 | 5/2019 | Chandler et al. | |
| 10,352,187 | B2 | 7/2019 | Keenan | |
| 10,364,828 | B2 | 7/2019 | Ikeguchi et al. | |
| 10,393,145 | B2 | 8/2019 | Medina Cruz et al. | |
| 10,443,431 | B2 | 10/2019 | Suciu et al. | |
| 10,458,271 | B2 | 10/2019 | Chandler et al. | |
| 10,508,660 | B2 | 12/2019 | Hall et al. | |
| 10,563,670 | B2 * | 2/2020 | Dierksmeier | F04D 29/563 |
| 10,626,747 | B2 | 4/2020 | Karapurath | |
| 10,634,000 | B2 | 4/2020 | Skertic et al. | |
| 10,662,804 | B2 | 5/2020 | Awtry et al. | |
| 10,718,230 | B2 * | 7/2020 | Littler | F01D 25/243 |
| 10,753,231 | B2 | 8/2020 | Mena-Dominguez | |
| 10,815,802 | B2 | 10/2020 | Prasad | |
| 10,927,699 | B2 | 2/2021 | Bromann et al. | |
| 11,105,219 | B2 | 8/2021 | Ward | |
| 11,125,115 | B2 | 9/2021 | Humhauser | |
| 11,131,323 | B2 | 9/2021 | Suciu et al. | |
| 11,371,380 | B2 | 6/2022 | Poick | |
| 2019/0093502 | A1 * | 3/2019 | Lyon | B23P 19/10 |
| 2020/0088108 | A1 | 3/2020 | Klein et al. | |

* cited by examiner

SYSTEMS AND METHODS FOR MULTI-DIMENSIONAL VARIABLE VANE STAGE RIGGING UTILIZING COUPLING MECHANISMS

FIELD OF THE DISCLOSURE

The present disclosure relates generally to gas turbine engines, and more specifically to variable vane assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include vane assemblies arranged within the engine components, such as inlet guide vanes and stator vanes. To provide for the necessary stall or surge margin at different power settings throughout operation of the gas turbine engine, variable, or adjustable, vanes may be utilized, such as variable inlet guide vanes and/or variable stator vanes. It is important to position of the vanes with extreme precision in order to accurately direct airflow within the engine.

SUMMARY

The present disclosure may comprise one or more of the following features and combinations thereof.

According to a first aspect of the present disclosure, a vane adjustment assembly for a gas turbine engine includes a plurality of vanes extending radially outward relative to a central axis of the gas turbine engine, an annular ring arranged radially outward of the central axis and coupled to the plurality of variable vanes, and a ring adjustment assembly. The ring adjustment assembly includes (i) a base frame mounted on the annular ring and including a support body extending axially away from the annular ring, the support body having a first cylindrical cavity formed therethrough that extends radially and that is offset axially from the annular ring, (ii) a first collar that is cylindrical and removably arranged within the first cylindrical cavity, the first collar having a second cylindrical cavity formed therein and opening radially outwardly, (iii) a second collar that is cylindrical and removably arranged within the second cylindrical cavity of the first collar, and (iv) a roller pin fixedly coupled to a radially outer surface of the second collar.

In some embodiments, a first central axis of the second cylindrical cavity is offset from a second central axis of the first collar and a third central axis of the roller pin is offset from a fourth central axis of the second collar, and the first collar is configured to be selectively arranged at a plurality of rotational positions within the first cylindrical cavity and the second collar is configured to be selectively arranged at a plurality of rotational positions within the second cylindrical cavity of the first collar such that the roller pin is configured to be positioned at a plurality of distinct roller pin positions each corresponding to a rotational position of the first collar and a rotational position of the second collar.

In some embodiments, the first collar is fixed relative to the first cylindrical cavity when arranged within the first cylindrical cavity, and the second collar is fixed relative to the second cylindrical cavity of the first collar when the second collar is arranged within the second cylindrical cavity. In some embodiments, the first cylindrical cavity is generally cylindrical, an inner circumferential surface defining the first cylindrical cavity substantially corresponds to an outer circumferential surface of the first collar such that the first collar may be arranged at the plurality of rotational positions within the first cylindrical cavity, and an inner circumferential surface defining the second cylindrical cavity substantially corresponds to an outer circumferential surface of the second collar such that the second collar may be arranged at the plurality of rotational positions within the second cylindrical cavity.

In some embodiments, the first collar is arranged within the first cylindrical cavity with an interference fit such that the first collar is securely held within the first cylindrical cavity. In some embodiments, the second collar is arranged within the second cylindrical cavity with an interference fit such that the second collar is securely held within the second cylindrical cavity.

In some embodiments, the inner circumferential surface defining the second cylindrical cavity is tapered in a radial direction of the annular ring such that a diameter of the second cylindrical cavity at a radially outermost side of the second cylindrical cavity is larger than a diameter of the second cylindrical cavity at a radially innermost side of the second cylindrical cavity, and the outer circumferential surface of the second collar is tapered such that a diameter of the second collar at a radially outermost side of the second collar is larger than a diameter of the second collar at a radially innermost side of the second collar.

In some embodiments, the tapered inner circumferential surface of the second cylindrical cavity and the tapered outer circumferential surface of the second collar cause a retention force of the second cylindrical cavity on the second collar to increase the further radially inwardly the second collar is arranged within the second cylindrical cavity.

In some embodiments, the inner circumferential surface defining the second cylindrical cavity includes at least one first step such that the inner circumferential surface includes a first stepped portion and a second stepped portion having a smaller diameter than the first stepped portion, and the outer circumferential surface of the second collar includes at least one second step such that the outer circumferential surface includes a third stepped portion corresponding to the first stepped portion and a fourth stepped portion corresponding to the second stepped portion and having a smaller diameter than the third stepped portion.

In some embodiments, the inner circumferential surface defining the first cylindrical cavity includes at least one third step such that the inner circumferential surface includes a fifth stepped portion and a sixth stepped portion having a smaller diameter than the fifth stepped portion, and the outer circumferential surface of the first collar includes at least one fourth step such that the outer circumferential surface includes a seventh stepped portion corresponding to the fifth stepped portion and an eighth stepped portion corresponding to the sixth stepped portion and having a smaller diameter than the seventh stepped portion.

In some embodiments, the support body of the base frame extends away from a first axially facing surface of the annular ring. In some embodiments, the base frame includes a bracket that is fixedly mounted on the annular ring, and the support body of the base frame extends away from a first axially facing surface of the bracket.

In some embodiments, the roller pin is selectively movably coupled to a casing of the gas turbine engine such that movement of the roller pin relative to the casing further adjusts the position of the annular ring relative to the casing, the roller pin is selectively movably coupled to the casing via a cam plate that is slidably coupled to the casing and slidable relative thereto, and the cam plate includes at least one slot within which the roller pin is slidably arranged.

In some embodiments, sliding of the cam plate relative to the casing in an axial direction causes the roller pin to slidably move within the at least one slot and further adjust a position of the annular ring relative to the casing, and the roller pin includes a roller pin head configured to be slidably arranged within the at least one slot and engage with edges of the at least one slot.

A vane adjustment assembly for a gas turbine engine includes an annular ring arranged radially outward of a central axis of the gas turbine engine and coupled to a plurality of variable vanes and a ring adjustment assembly. The ring adjustment assembly includes (i) a base frame mounted on the annular ring having a first cavity formed therethrough that is offset axially from the annular ring (ii) a first collar removably arranged within a first cavity formed in the annular ring, the first collar having a second cavity eccentrically formed therein, (iii) a second collar removably arranged within the second cavity of the first collar, and (iv) a roller pin eccentrically arranged on the second collar.

In some embodiments, the first collar is configured to be selectively arranged at a plurality of rotational positions within the first cavity and the second collar is configured to be selectively arranged at a plurality of rotational positions within the second cavity of the first collar such that the roller pin is configured to be positioned at a plurality of distinct roller pin positions each corresponding to a rotational position of the first collar and a rotational position of the second collar.

In some embodiments, the first cavity is generally cylindrical, an inner circumferential surface defining the first cavity substantially corresponds to an outer circumferential surface of the first collar such that the first collar may be arranged at the plurality of rotational positions within the first cavity, and an inner circumferential surface defining the second cavity substantially corresponds to an outer circumferential surface of the second collar such that the second collar may be arranged at the plurality of rotational positions within the second cavity.

In some embodiments, the first collar is arranged within the first cavity with an interference fit such that the first collar is securely held within the first cavity, and the second collar is arranged within the second cavity with an interference fit such that the second collar is securely held within the second cavity.

In some embodiments, the inner circumferential surface defining the second cylindrical cavity is tapered in a radial direction of the annular ring such that a diameter of the second cylindrical cavity at a radially outermost side of the second cylindrical cavity is larger than a diameter of the second cylindrical cavity at a radially innermost side of the second cylindrical cavity, and the outer circumferential surface of the second collar is tapered such that a diameter of the second collar at a radially outermost side of the second collar is larger than a diameter of the second collar at a radially innermost side of the second collar.

In some embodiments, the roller pin is selectively movably coupled to a casing of the gas turbine engine such that the plurality of distinct roller pin positions each corresponding to a rotational position of the first collar and a rotational position of the second collar each further correspond to distinct positions of the roller pin relative to the casing and distinct positions of the annular ring relative to the casing, the roller pin is selectively movably coupled to the casing via a cam plate that is slidably coupled to the casing and slidable relative thereto, and the cam plate includes at least one slot within which the roller pin is slidably arranged.

According to a further aspect of the present disclosure, a method of adjusting a vane assembly of a gas turbine engine includes providing a plurality of vanes of the vane assembly, the plurality of vanes extending radially outward relative to a central axis of the gas turbine engine, arranging an annular ring radially outward of the central axis, and coupling the annular ring to the plurality of vanes. The method can further include mounting a base frame on the annular ring, the base frame including a support body extending axially away from the annular ring, the support body having a first cylindrical cavity formed therethrough that extends radially and that is offset axially from the annular ring, selectively and removably arranging a first collar that is cylindrical within the first cylindrical cavity at a first rotational position therein, the first collar having a first cylindrical cavity formed therein and opening radially outwardly, fixedly coupling a roller pin to a radially outer surface of a second collar that is cylindrical, and selectively and removably arranging the second collar within the second cylindrical cavity of the first collar at a second rotational position therein so as to locate the roller pin at a first discrete roller pin position.

In some embodiments, a first central axis of the first cylindrical cavity is offset from a second central axis of the first collar and a third central axis of the roller pin is offset from a fourth central axis of the second collar, and the first collar is configured to be selectively arranged at a plurality of rotational positions including the first rotational position within the first cylindrical cavity and the second collar is configured to be selectively arranged at a plurality of rotational positions including the second rotational position within the second cylindrical cavity of the first collar such that the roller pin is configured to be positioned at a plurality of distinct roller pin positions including the first discrete roller pin position each corresponding to a rotational position of the first collar and a rotational position of the second collar.

These and other features of the present disclosure will become more apparent from the following description of the illustrative embodiments.

DETAILED DESCRIPTION OF THE DRAWINGS

Figure 1:
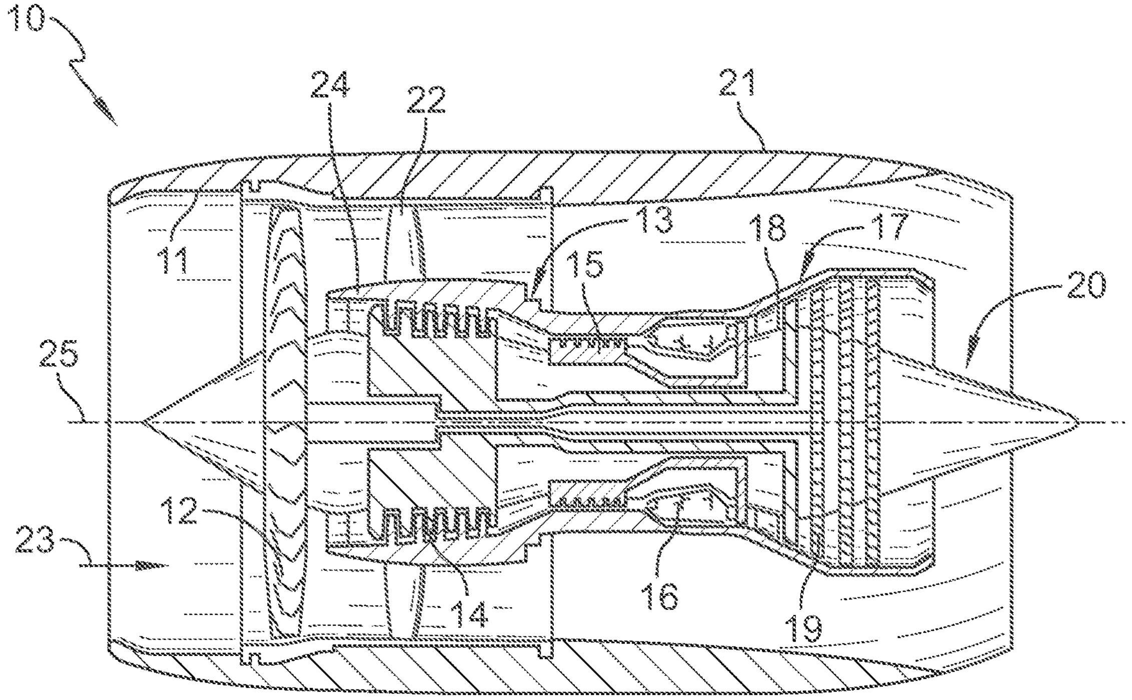
FIG. 1 is a cutaway view of a gas turbine engine with which a vane adjustment assembly according to the present disclosure may be utilized, showing that the gas turbine engine includes a propulsive fan, an engine core including a compressor, a combustor, and a turbine configured to drive the first propulsive fan, and a bypass duct surrounding the engine core.
Figure 2:
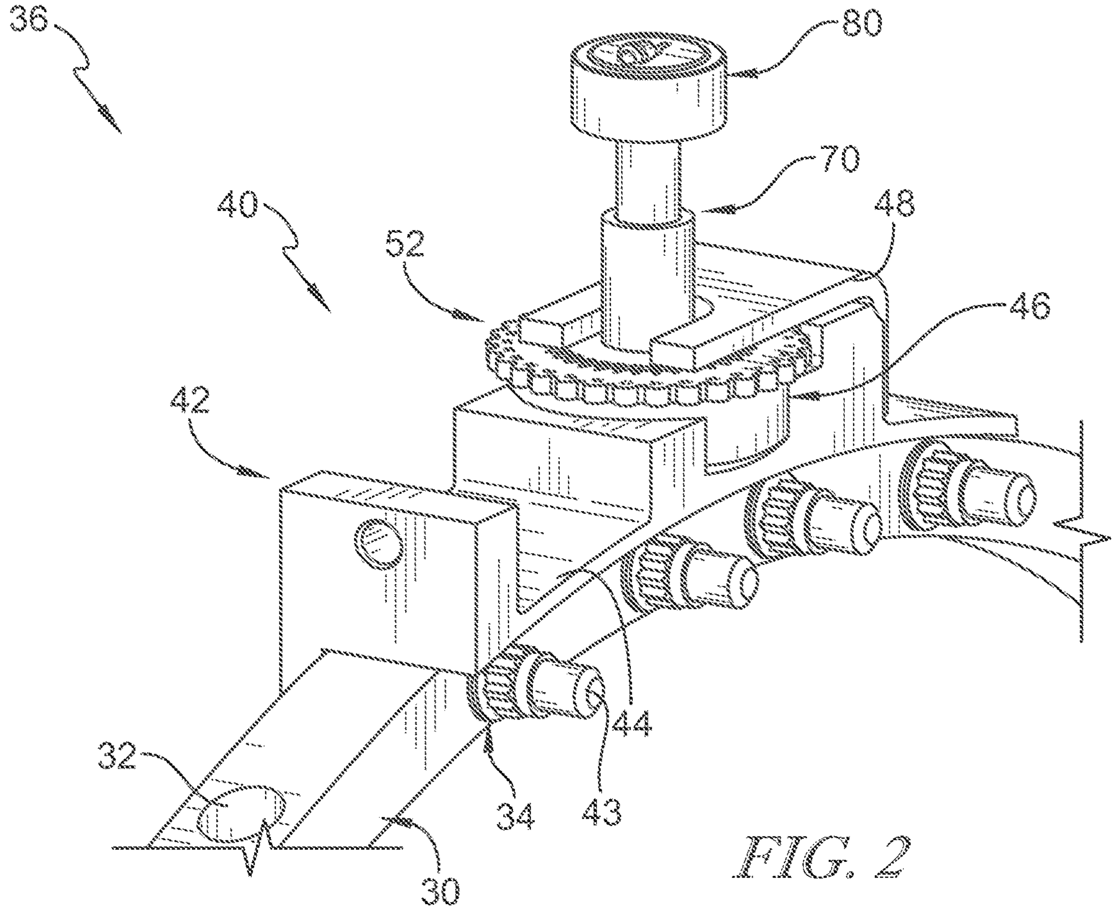
FIG. 2 is a perspective view of a vane adjustment assembly according to the present disclosure, showing that the assembly includes an annular ring and a ring adjustment assembly arranged on the annular ring, the ring adjustment assembly including a base plate, a first collar arranged in a recess in the base plate, a second collar arranged in a cavity in the first collar, and a roller pin fixedly coupled to the second collar, the cavity of the first collar being eccentrically formed in the first collar and the roller pin being eccentrically arranged on the second collar.

For the purposes of promoting an understanding of the principles of the disclosure, reference will now be made to a number of illustrative embodiments illustrated in the drawings and specific language will be used to describe the same.

The present disclosure is related to vane adjustment assemblies 36, 136, 236, 336, 436 configured to be utilized in a gas turbine engine 10, in particular vane adjustment assemblies 36, 136, 236, 336, 436 including a ring adjustment assembly 40, 140, 240, 340, 440 having a base plate or frame 42, 142, 242, 342, 442, a first collar 52, 152, 252, 352, 452, a second collar 62, 162, 262, 362, 462 arranged in an eccentrically formed first cavity 54, 154, 254, 354, 454, and a roller pin 70, 170, 270, 370, 470 eccentrically coupled to the second collar 62, 162, 262, 362, 462. The eccentricity of the first cavity 54, 154, 254, 354, 454 and the arrangement of the roller pin 70, 170, 270, 370, 470 on the second collar 62, 162, 262, 362, 462 enable the first and second collars 52, 152, 162, 252, 262, 352, 362, 452, 462 to be selectively arranged at a plurality of rotational positions within the first cavity 54, 154, 254, 354, 454 and relative to the second collar 62, 162, 262, 362, 462, respectively, such that the roller pin 70, 170, 270, 370, 470 can be positioned at distinct roller pin positions each corresponding to a rotational position of the first collar 52, 152, 252, 352, 452 and a rotational position of the second collar 62, 162, 262, 362, 462. A person skilled in the art will understand that the disclosed vane adjustment assemblies 36, 136, 236, 336, 436 may be utilized in any type of engine similar to a gas turbine engine or any turbomachinery including vanes.

A vane adjustment assembly 36 according to a first aspect of the present disclosure is shown in FIGS. 2 and 4-8D. In an illustrative embodiment, the vane adjustment assembly 36 is configured to be utilized in a turbofan gas turbine engine 10, as shown in FIG. 1. The exemplary gas turbine engine 10 includes an inlet 11, a fan 12, an engine core including a compressor 13 having an inter-stage compressor section 14 and a compressor discharge section 15, a combustor 16, and a turbine 17 having a high-pressure turbine 18 and a low-pressure turbine 19. The fan 12 is driven by the turbine 17 and provides thrust for forwardly propelling an aircraft on which the gas turbine engine 10 is coupled. The compressor 13 compresses and delivers air 23 to the combustor 16. The combustor 16 mixes fuel with the compressed air 23 received from the compressor 13 and ignites the fuel. The hot, high-pressure products of the combustion reaction in the combustor 16 are directed into the turbine 17 to cause the turbine 17 to rotate about an axis 25 of the gas turbine engine 10 and drive the compressor 13 and the fan 12 and exhaust remaining mixture out of the turbine 17 over an exhaust plug 20. The engine 10 may include a nacelle 21 that houses the engine components described above.

Figure 3A:
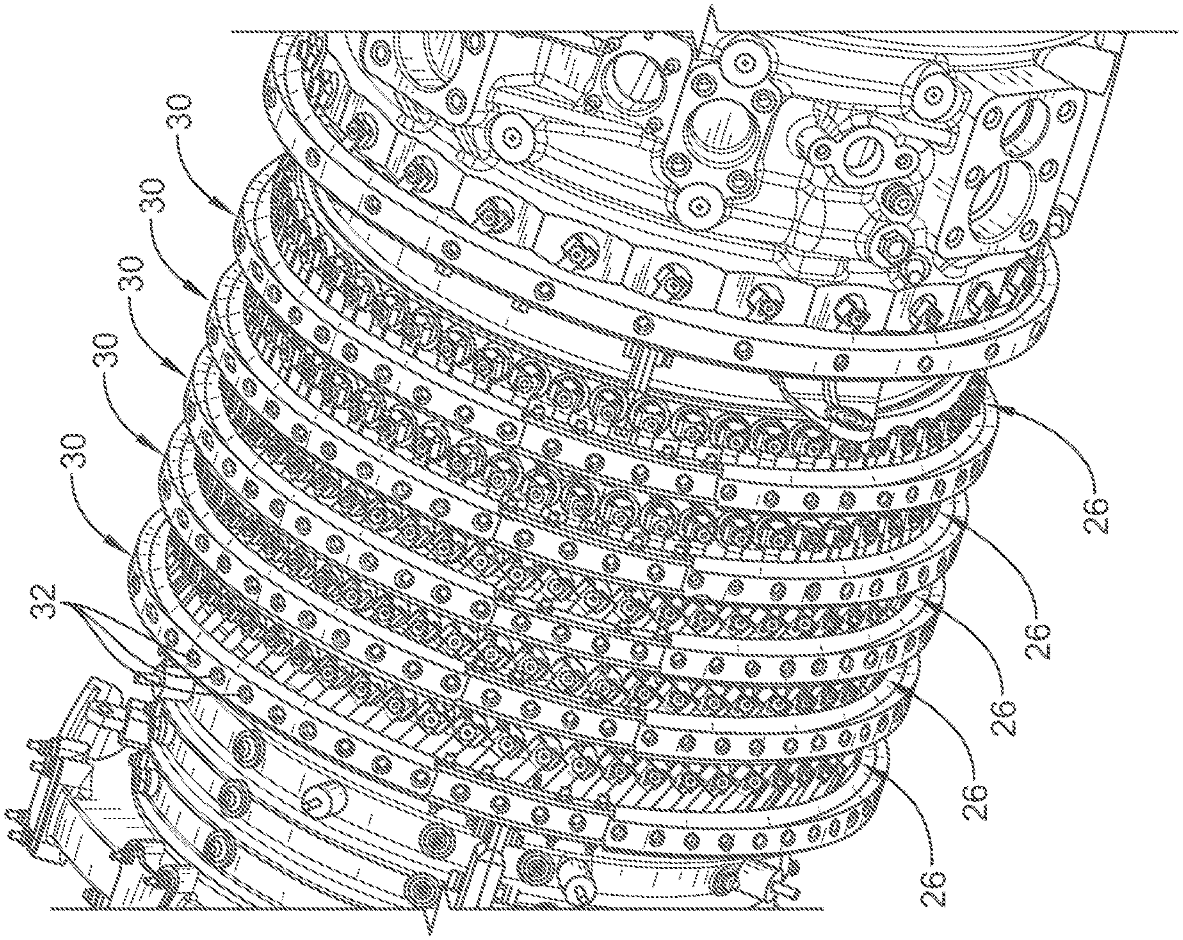
FIG. 3A is a perspective view of a compressor section of the engine of FIG. 1, showing that the engine includes multiple annular rings associated with adjacent vane stages of the compressor section, each annular ring being coupled to an associated plurality of vanes of each vane stage so as to control the associated plurality of variable vanes.

The engine 10 includes a casing 24, which may be formed as a single component or multiple cojoined components, that surrounds the various sections of the engine 10, including the compressor 13, the combustor 16, and the turbine 17. Illustratively, the compressor 13 and/or turbine 17 sections may include multiple stages of a plurality of vanes 26 arranged between stages of bladed rotors, as shown in FIG. 3A. In an exemplary embodiment, the compressor section 13 of the engine 10 may include multiple stages, in particular five stages as shown in FIG. 3A, of pluralities of vanes 26, each surrounded by an annular ring 30.

Figure 3B:
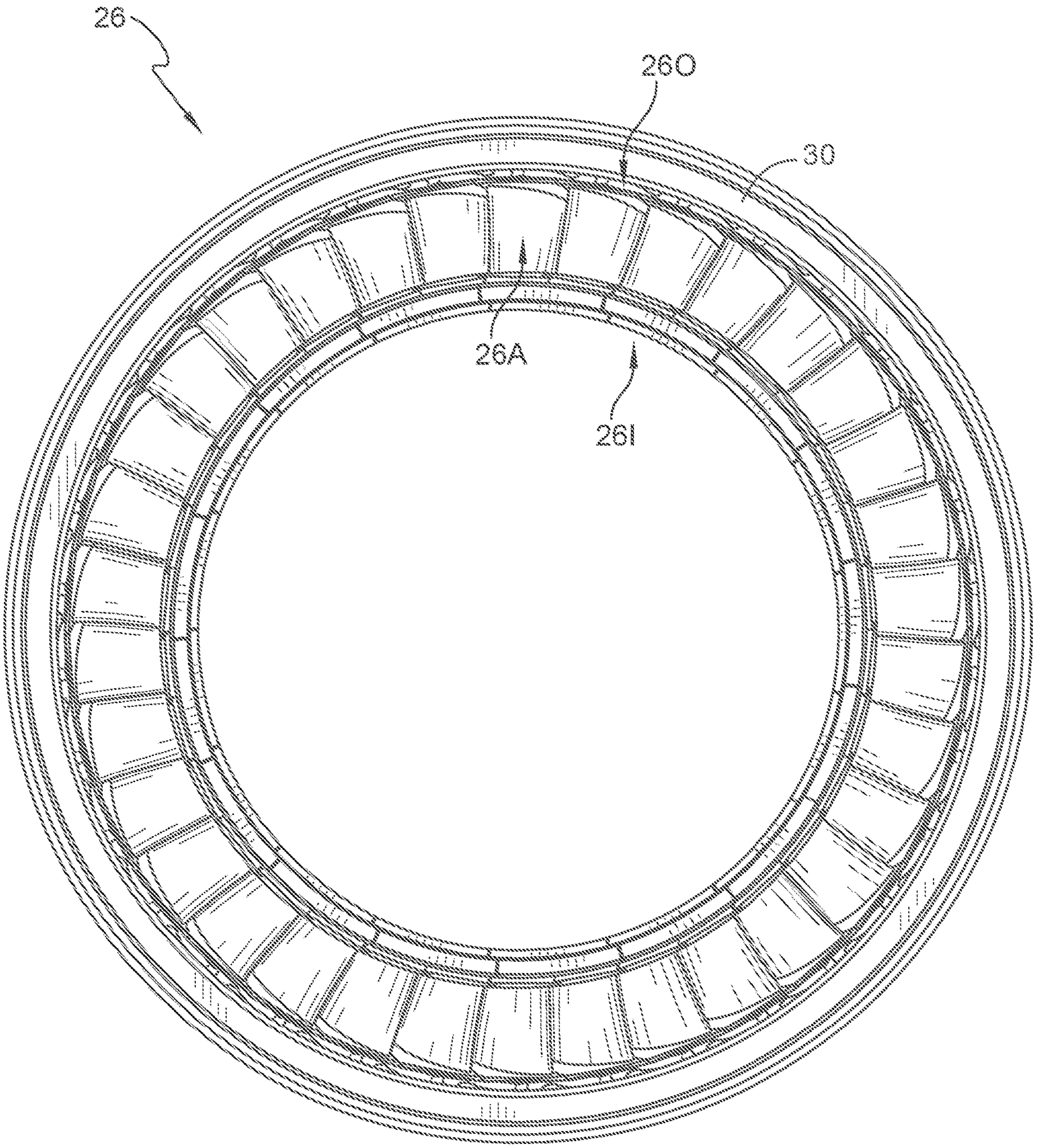
FIG. 3B is a front view of a plurality of vanes of a vane stage of the vane assembly of FIG. 3A.

In some embodiments, the plurality of vanes 26 include individual vane airfoils 26A having inner and outer platforms 261, 260, as shown in FIG. 3B. The plurality of vanes 26 may be surrounded by an annular ring 30. At least some or all of the vanes of the plurality of vanes 26 in some or all of the stages described above may be variable vanes that are configured to rotate so as to selectively redirect incoming air exiting an axially forward bladed rotor and subsequently onto other components of the engine 10.

In the illustrative embodiment, the vane adjustment assembly 36 is configured to be utilized in the compressor or turbine sections 13, 17 of the engine 10, although in other embodiments, a person skilled in the art could envision the adjustment assembly 36, or any other vane assemblies described herein, being utilized in other sections of the engine 10, such as with variable fan outlet guide vanes 22 arranged downstream of the fan 12 or inlet guide vanes arranged upstream of the fan 12.

Figure 3C:
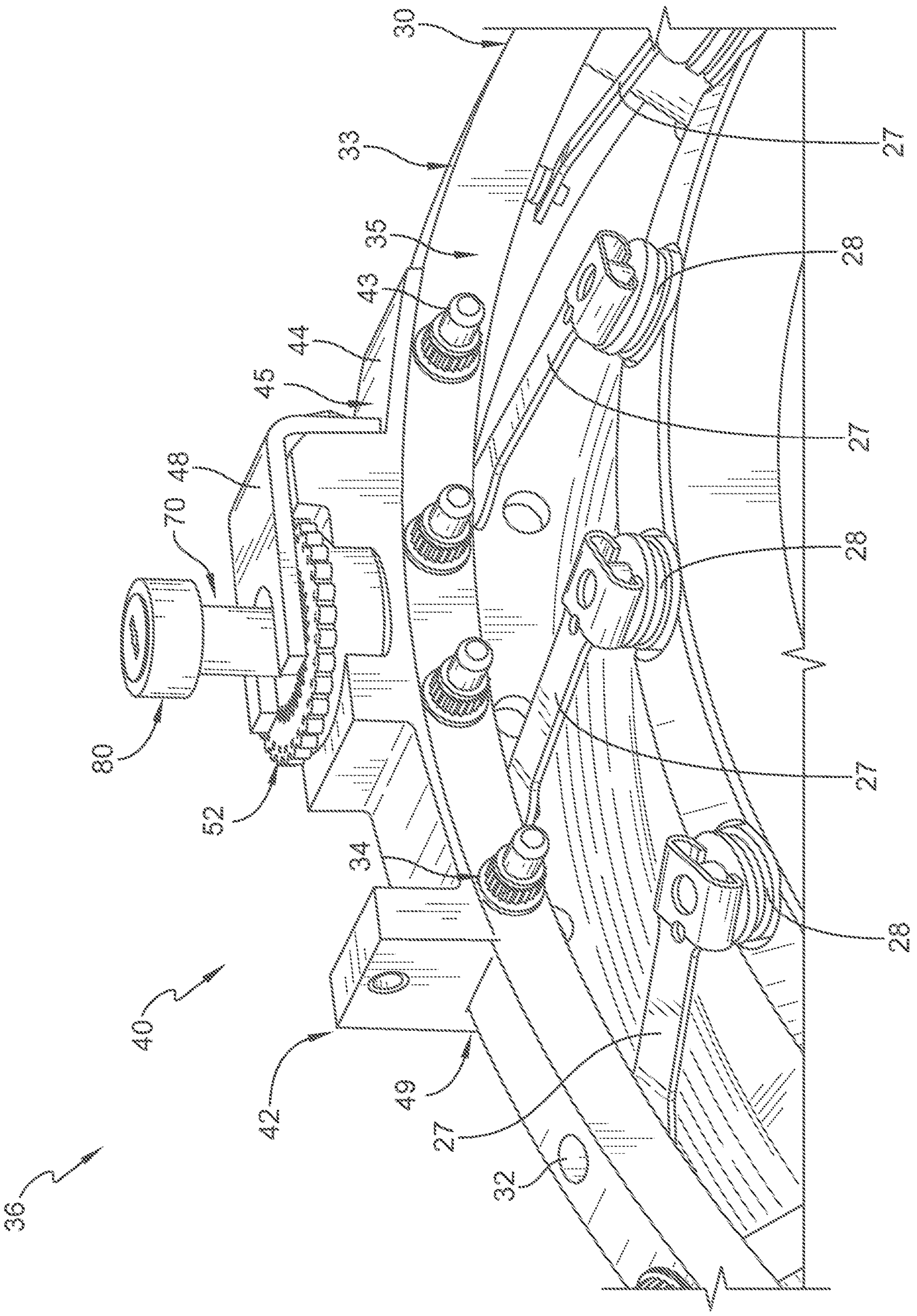
FIG. 3C is a perspective view of the vane adjustment assembly of FIG. 2 arranged on an annular ring, showing the annular ring coupled to each vane of the plurality of vanes via an actuator lever and a bearing coupled to a radially outer end of the vane.

As shown in FIG. 3C, the vane adjustment assembly 36 can be arranged on a radially outer surface 33 of the annular ring 30, although in other embodiments, as will be described below, the assembly may be arranged on an axially facing surface 35 of the annular ring 30. The annular ring 30 can be coupled to each vane of the plurality of vanes 26 via an actuator lever 27 that is rotatably coupled to the annular ring 30 at an attachment hole 32 of the ring 30 and a bearing 28 coupled to a radially outer end of the vane. Movement of the annular ring 30, in particular circumferentially or axially, will affect the positioning of the plurality of vanes 26. In some embodiments, the rings 30 and vanes 26 are moved as the engine power and operating environment changes, such as between take-off, cruise, landing, etc. or between different temperatures, altitudes, pressures, etc.

Illustratively, the annular ring 30 is formed as a fully annular ring that is movably or slidably arranged relative to the casing 24 so as to rotate annularly relative thereto, as shown in FIG. 3A. The annular ring 30 may be formed as a single monolithic component, or may be formed in sections that are coupled together to form the fully annular ring 30. As can be seen in FIG. 3A and FIG. 3B, the annular ring 30 is arranged axially aft relative to the plurality of vanes 26, although a person skilled in the art will understand that, in other embodiments, the ring 30 may be arranged axially forward of the plurality of vanes 26. In some embodiments, the annular ring 30 is coaxial with the plurality of vanes 26, and more specifically, with the central axis 25.

Figure 3D:
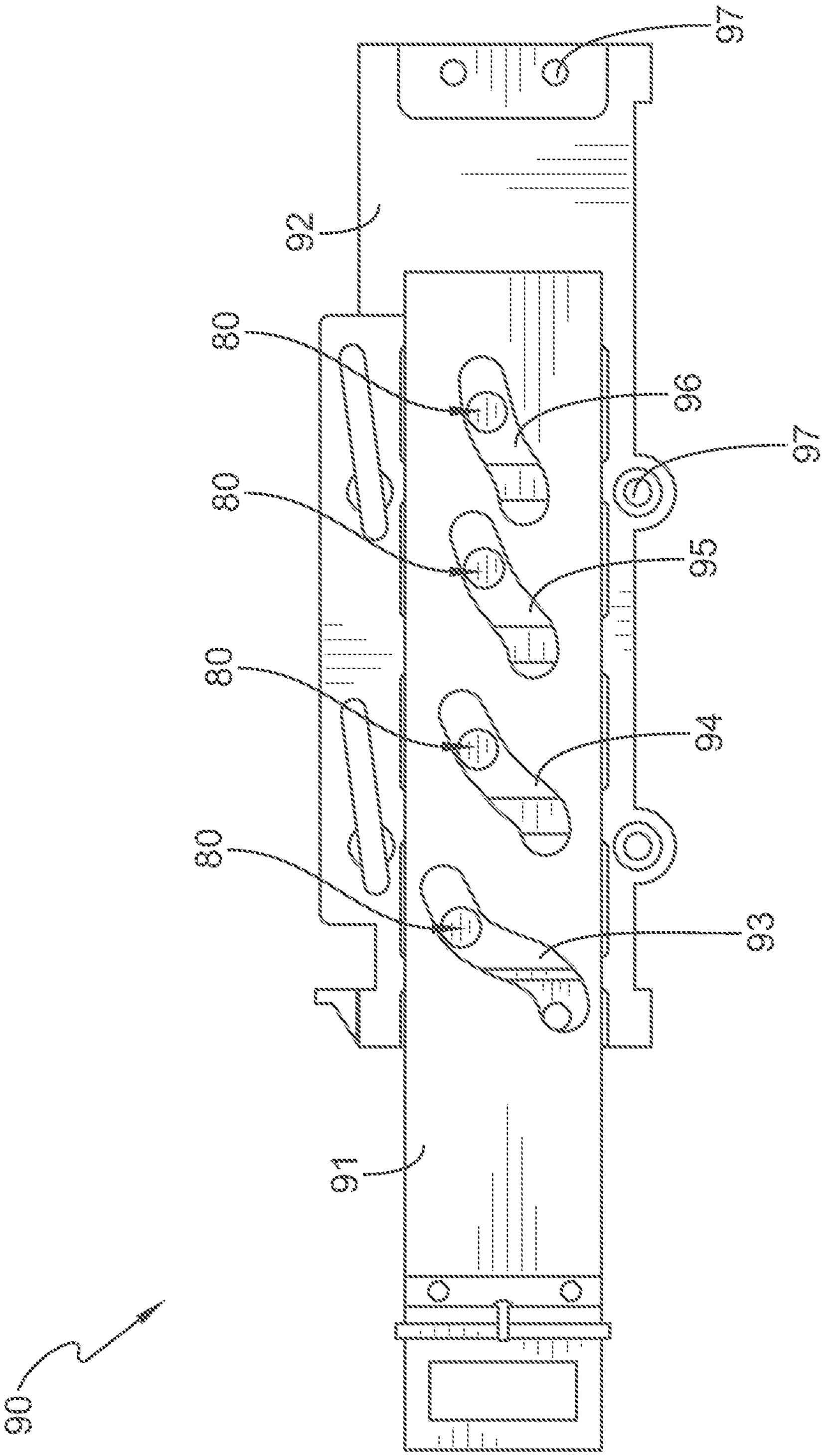
FIG. 3D is a top view of a cam plate configured to slidably engage the roller pin of the vane adjustment assembly of FIG. 2, showing that the cam plate is slidable in the axial direction relative to the casing so as to move the roller pins within slots formed in the cam plate.

As shown in FIG. 3D, a cam plate assembly 90 may be utilized to movably couple the vane adjustment assembly 36 to the casing 24. The cam plate assembly 90 includes a slidable cam plate 91 and a stationary support plate 92 fixedly coupled to the casing 24 at fastening points 97. The cam plate 91 may be slideable coupled to the support plate 92 either on a radially outer side of the support plate 92, as shown in FIG. 3D, or on a radially inner side of the support plate 92.

The cam plate 91 includes a plurality of slots 93, 94, 95, 96 which, when the cam plate 91 is arranged on the support plate 92, are aligned with the individual vane stages, for example, shown in FIG. 3A. The roller pin 70 of the vane adjustment assembly 36 of each vane stage is slidably arranged within each the corresponding slot 93, 94, 95, 96 via a roller pin head 80. The slots 93, 94, 95, 96 may be include the same or varying elongated shapes configured provide the same or differing movement paths for the roller pin heads engage the roller pin head 80 of the vane adjustment assembly 36. In operation, the cam plate 91 can be moved in the axial direction relative to the stationary support plate 92, and thus relative to the casing 24, so as to move the roller pin heads 80 within the slots 93, 94, 95, 96 and thus along the specific paths defined by the slots 93, 94, 95, 96. The movement of the roller pin heads 80 will in turn move the annular ring 30 that is coupled to the roller pins 70 via the vane adjustment assembly 36.

With the cam plate 91, the roller pin 70 of the vane adjustment assembly 36 may be moved to a plurality of distinct roller pin positions that, in addition to each corresponding to a rotational position of the first collar 52 and a rotational position of the second collar 62 (i.e. due to the rotational position of the first collar 52 within the recess 46 and the rotational position of the second collar 62 within the first collar 52), each further correspond to distinct positions of the roller pin 70 relative to the casing 24. Moreover, due to the roller pin 70 being coupled to the annular ring 30 via the adjustable collars 52, 62, the movement of the roller pin 70 relative to the casing 24 via the cam plate 91 will also affect the positioning of the annular ring 30 relative to the casing 24.

In order to further fine-tune and adjust the positioning of the plurality of vanes 26 via the positioning of the annular ring 30, the vane adjustment assembly 36 further includes the ring adjustment assembly 40 shown in FIGS. 4-8D. Illustratively, the ring adjustment assembly 40 includes a base plate 42 coupled to the annular ring 30, a first collar 52, a second collar 62, and a roller pin 70 fixedly coupled to the second collar 62.

Figure 4:
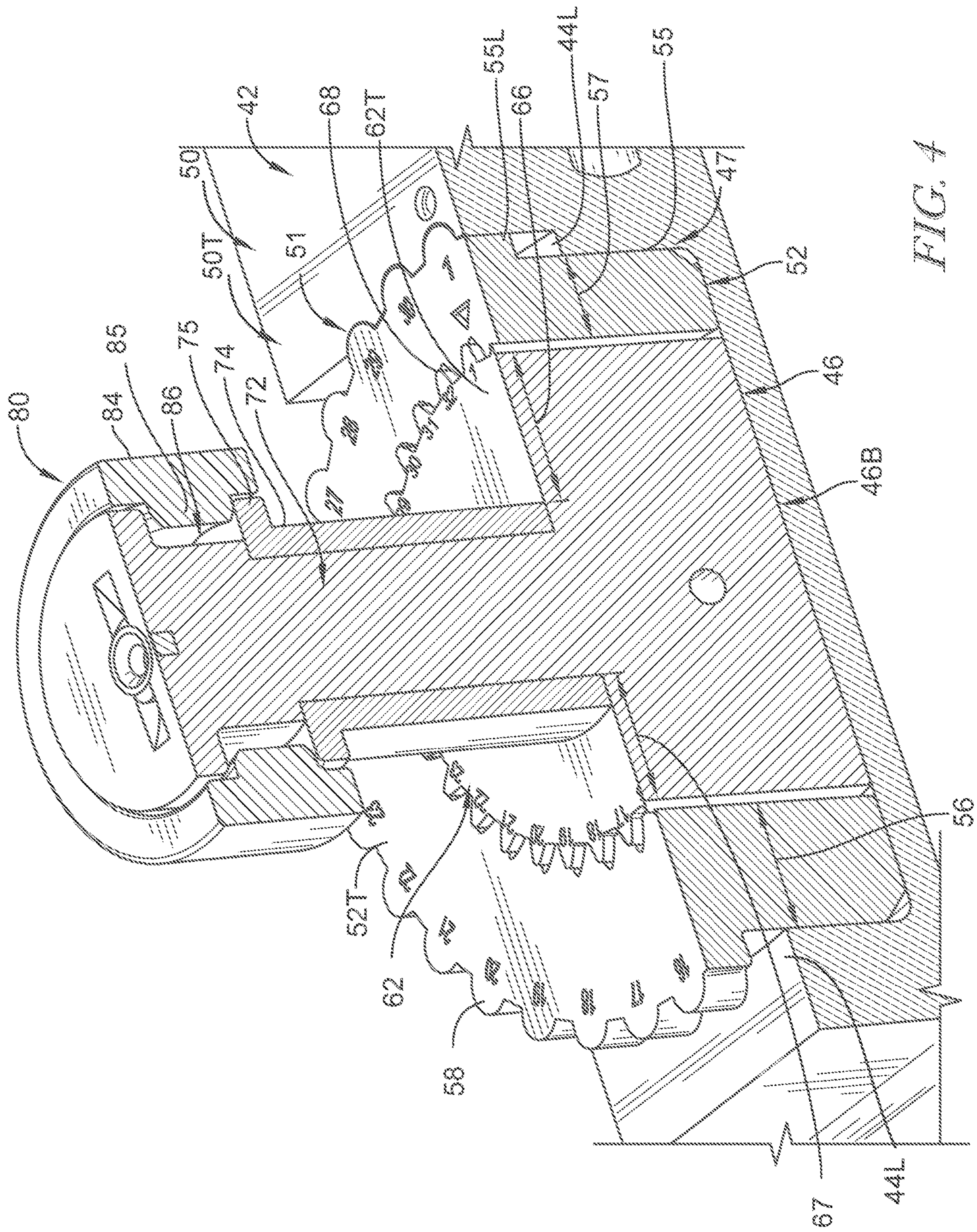
FIG. 4 is a perspective cross-sectional view of the vane adjustment assembly of FIG. 2, showing that the first and second collars each include spline teeth configured to engage with corresponding spline grooves formed in the recess and cavity of the base plate and first collar, respectively, and showing the first collar being eccentrically formed in the first collar and the roller pin being eccentrically arranged on the second collar such that the teeth and grooves allow for selective placement of the first and second collars relative to each other and to the recess of the base plate such that the roller pin can be positioned at distinct positions each corresponding to a rotational position of the first collar and a rotational position of the second collar.

As can be seen FIGS. 3C and 4, the base plate 42 can include a base body 44 arranged on the outer radial surface 33 of the annular ring 30 and that generally conforms to the outer radial surface 33. An axial side surface 49, which may be an axial aft side surface 49 as shown in FIG. 3C, that depends radially inwardly from the base body 44 may be fastened to the annular ring 30 via fasteners 43 extending through axially extending holes 34 formed in the annular ring 30.

As shown in greater detail in FIG. 4, the base body 44 includes a recess 46 formed in a radial outer surface 45 of the base body 44. The recess 46 may be formed to be cylindrical, as shown in the embodiment of FIG. 4, although a person skilled in the art will understand that other shapes may be utilized based on the design of the first collar 52 and the annular ring 30, as will be described below. Illustratively, the recess 46 is formed as a cylindrical cavity. In some embodiments, the recess 46 may be formed as a hole that extends entirely through the base body 44 so as open radially outwardly and inwardly, in which embodiments the first collar 52 may rest in the recess 46 on the underside of a circumferential lip 55L formed on the first collar 52, in particular with the lip 55L resting on a top lip 44L or top outer. In some embodiments, an inner circumferential surface 47 of the recess 46 is formed to substantially match an outer circumferential surface 55 of the first collar 52 such that the first collar 52 can be securely arranged therein. As such, the first collar 52 may easily be arranged at the plurality of rotational positions within the recess 46.

Figure 7:
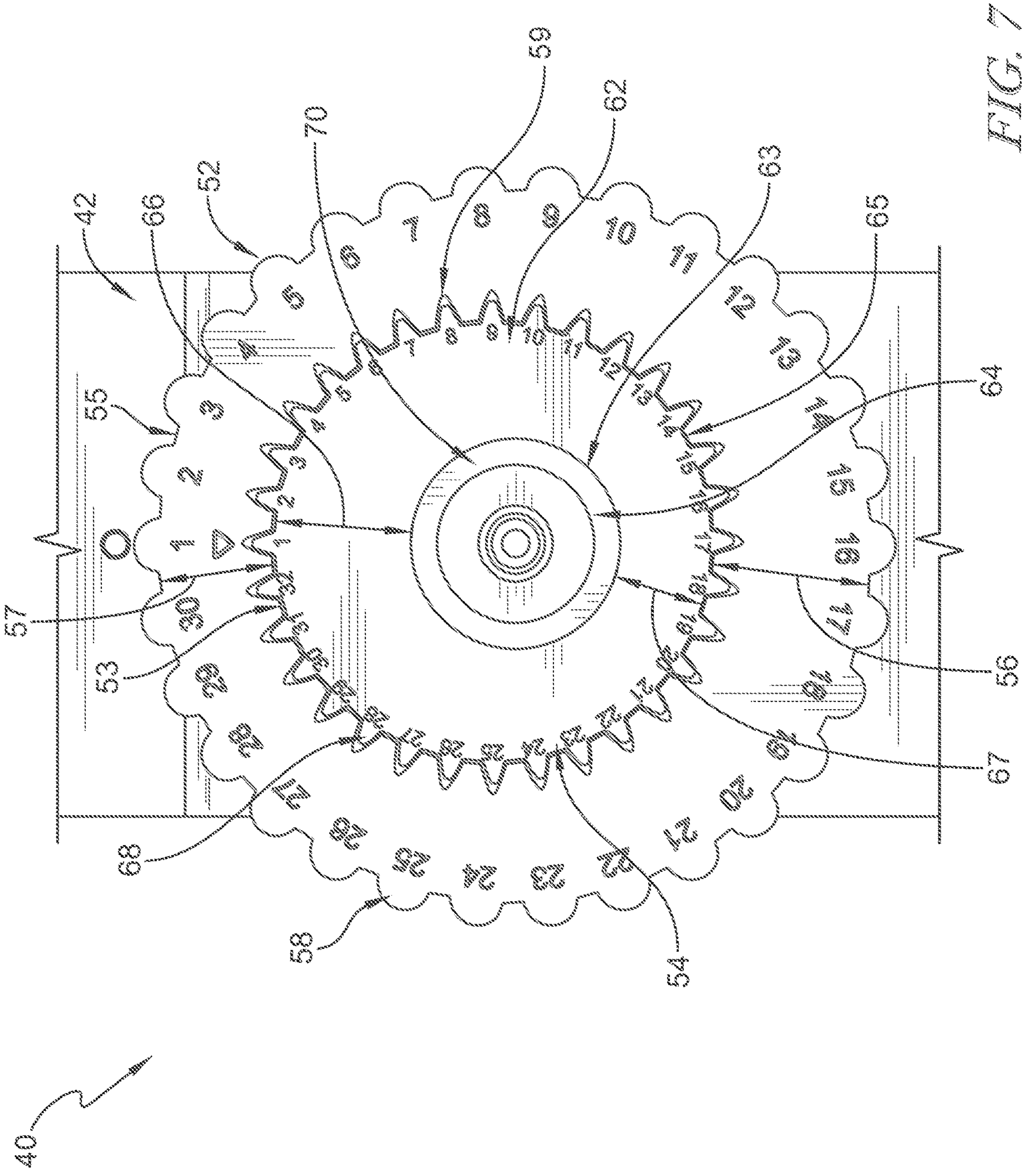
FIG. 7 is a top view of the first collar, the second collar, and the roller pin of the vane adjustment assembly of FIG. 2.

As can be seen in FIG. 4, the base body 44 of the base plate 42 includes a radially raised portion 50 that includes a plurality of spline grooves 51 formed therein, in particular in a circumferentially facing side of the raised portion 50. In some embodiments, the raised portion 50 may include a top surface 50T that is substantially coplanar with a top surface 52T of the first collar 52. In some embodiments, the raised portion 50 may extend radially outwardly beyond a top opening of the recess 46, as shown in FIG. 4. As can be seen in FIG. 7, the width of the base body 44 as well as the width of the raised portion 50 may be less than the diameter of the first collar 52. As a result, a portion of the first collar 52 may extend axially beyond the axially forward and aft edges of the recess 46.

The ring adjustment assembly 40 further includes the first collar 52 and the second collar 62, as shown in FIGS. 4-7. The first collar 52 is configured to be removably arranged within the recess 46. Illustratively, the first collar 52 is cylindrical and includes a diameter that is greater than the radial height of the collar 52. In some embodiments, the first collar 52 may include alternative shapes when viewed in a radial direction of the first collar 52, so long as the first collar 52 can engage with the recess 46 so as to hold the first collar 52 at fixed rotational positions relative to the recess 46.

By way of a non-limiting example, the recess 46 and the first collar 52 may include cross-sectional shapes that are polygonal, including any number of sides that would enable placement of the first collar 52 fixedly therein. For example, the first collar 52 and the recess 46 may each include a cross-sectional shape that is a polygon and includes an equal number of sides. In some embodiments, the cross-sectional shape of the first collar 52 may include 10 sides, and the cross-sectional shape of the recess 46 may include 10 sides. In another example, the cross-sectional shape of one of the recess 46 and the first collar 52 may include more sides than the cross-sectional shape of the other of the recess 46 and the first collar 52, and the corners formed by the multiple sides of the first collar 52 nevertheless rest within the recess 46 while still fixing the first collar 52 at various rotational positions within the recess 46. In some embodiments, the first collar 52 and the recess 46 each include a polygonal shape having 3 to 30 sides.

Figure 5:
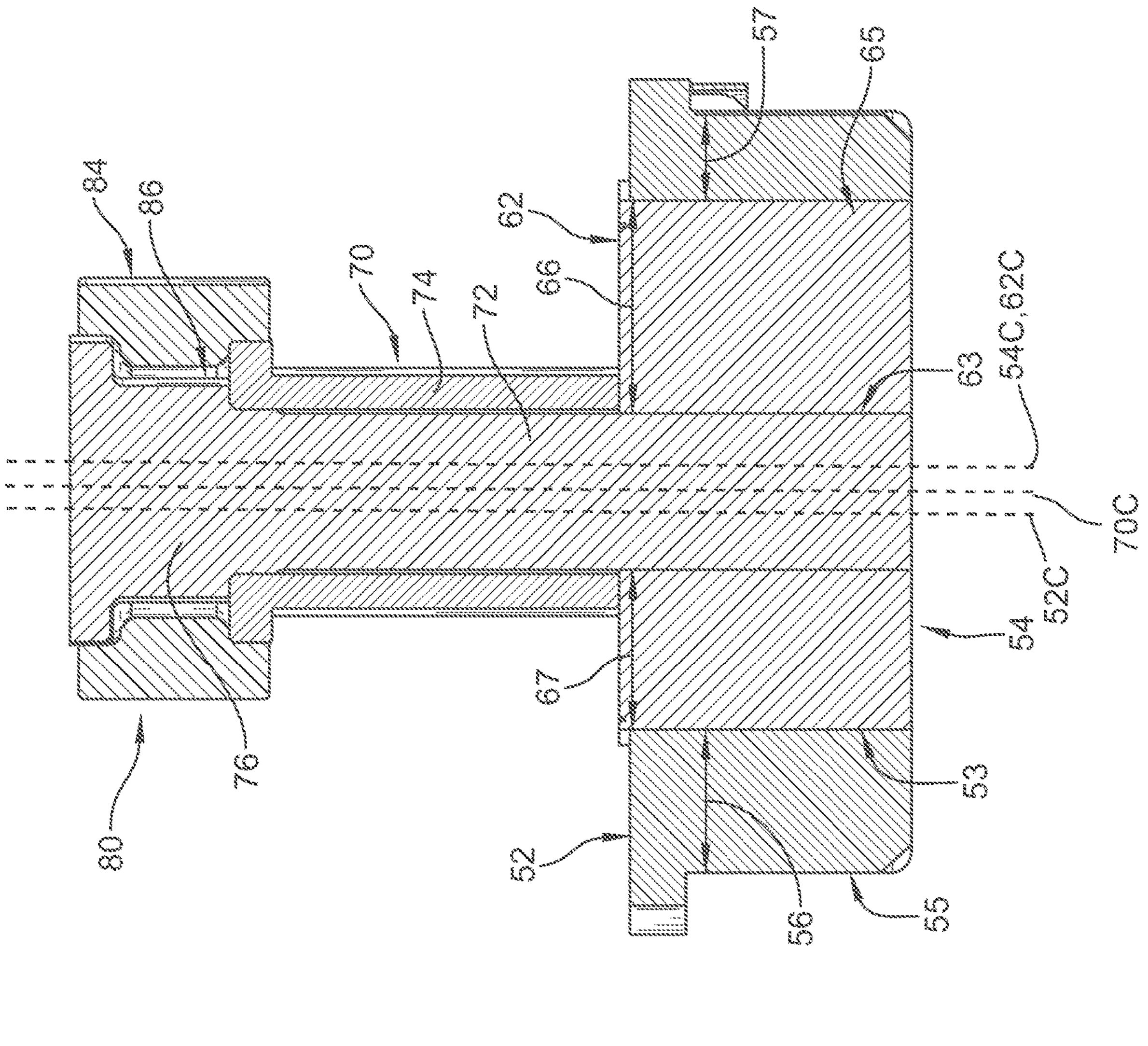
FIG. 5 is a side cross-sectional view of the vane adjustment assembly of FIG. 2, showing the first collar being eccentrically formed in the first collar and the roller pin being eccentrically arranged on the second collar.
Figure 6:
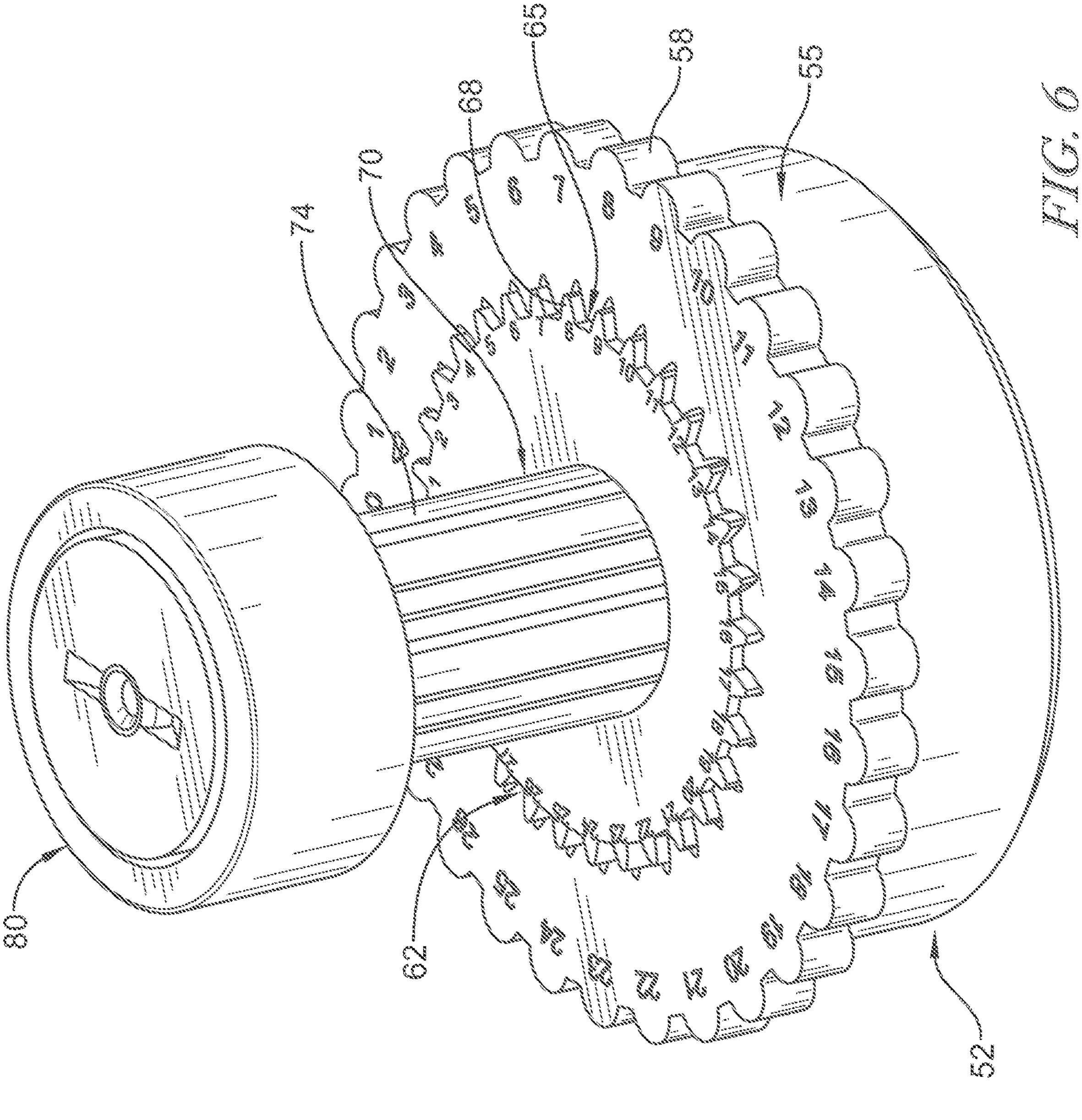
FIG. 6 is a perspective view of the first collar, the second collar, and the roller pin of the vane adjustment assembly of FIG. 2.

In the illustrative embodiment, the first collar 52 is formed cylindrically and includes an upper lip 55L formed on the outer circumferential surface 55 of the first collar 52, as shown in FIGS. 4-6. When arranged in the recess 46, the bottom of the collar 52 may rest on the bottom surface 46B of the recess 46, although in embodiments in which the recess 46 is a hole that extends entirely through the base body 44, the underside of the upper lip 55L may rest on the lip 44L on the outside of the recess 46.

The first collar 52 further includes a first cavity 54 formed therein, also referred to as a first cylindrical cavity 54, as shown in FIGS. 4-6. The first cavity 54 is defined by an inner circumferential surface 53 that extends entirely around the first collar 52 so as to define the cavity 54. In some embodiments, the cavity 54 is a large hole that extends entirely radially through the first collar 52, as shown in FIGS. 4 and 5. In some embodiments, the first cavity 54 may be formed as a recess having a bottom surface formed by a radially inner side of the first collar 52. In such an embodiment, the second collar 62 would not contact the bottom surface 46B of the recess 46 when arranged within the first cavity 54.

As can be seen in FIGS. 4 and 5, the first cavity 54 is formed eccentrically within the first collar 52. In other words, a central axis 54C of the first cavity 54 is formed offset from a central axis 52C of the first collar 52, as shown in FIG. 5. As result of the eccentricity of the first cavity 54, the first collar 52 includes a radial thickness (measured in the radial direction of the first collar 52 from the outer circumferential surface 55 to the inner circumferential surface 53) that is largest at line 56, and smallest at line 57.

The first collar 52 further includes a second plurality of spline grooves 59 formed on the inner circumferential surface 53. The second plurality of spline grooves 59 are formed similarly to the spline teeth 68 formed on the outer circumferential surface 65 of the second collar 62 so as to engage the spline teeth 62 and fixedly secure the second collar 62 within the first cavity 54 such that it cannot rotate relative thereto. As described herein, spline teeth may refer to any type of geared tooth, such as flat sided teeth for example, capable of interacting with corresponding grooves. The size of teeth may be related to manufacturing, tooth stress, assembly, robustness, etc.

As can be seen in FIGS. 4, 6, and 7, the first collar 52 is fixed relative to the recess 46 when arranged within the recess 46. In particular, the outer circumferential surface 55 of the first collar 52 includes a first plurality of spline teeth 58 formed thereon that extend radially outwardly relative to the central axis 52C of the first collar 52. The first plurality of spline teeth 58 are sized and shaped to engage with the first plurality of spline grooves 51 of the top portion 50 of the base body 44 when the first collar 52 is arranged within the recess 46 so as to fix the first collar 52 in a rotational position relative to the recess 46. In some embodiments, the circumferentially inner surface on which the spline grooves 51 are formed may be considered part of the recess 46. Moreover, the base plate 42 may further include a top bracket 48 that extends over the radial top surface 62T of the first collar 52, as well as the second collar 62, to secure the first collar 52 in the recess 46.

Illustratively, the first collar 52 includes 30 spline teeth 58 formed on the outer circumferential surface 55, as shown in FIG. 7. The spline grooves 51 formed on the top portion 50 are spaced apart so as to match the spacing of the spline teeth 58. In some embodiments, the first collar 52 can include any number of spline teeth 58, where more spline teeth 58 allow for the first collar 52 to be arranged at more discrete rotational positions within the recess 46 than less spline teeth 58. In some embodiments, the first collar 52 may include a range of 2 to 180 spline teeth 58, and more particularly, a range of 2 to 90 spline teeth 58, and more particularly, 2 to 45 spline teeth 58, and more particularly, 2 to 30 spline teeth 58. In some embodiments, the first collar 52 can include spline teeth 58 around an entirety of the outer circumferential surface 55, as shown in FIGS. 4, 5, and 7. In some embodiments, the spline teeth 58 may be spaced apart around the outer circumferential surface 55, or may be formed in groups around the outer circumferential surface 55.

As can be seen in FIGS. 4-7, the second collar 62 is configured to be removably arranged within the first cavity 54. Illustratively, the second collar 62 is cylindrical and includes a diameter that is greater than the radial height of the collar 62. In some embodiments, the second collar 62 may include alternative shapes when viewed in a radial direction of the second collar 62, so long as the second collar 62 can engage with the first cavity 54 so as to hold the second collar 62 at fixed rotational positions relative to the first cavity 54.

By way of a non-limiting example, the first cavity 54 and the second collar 62 may include cross-sectional shapes that are polygonal, including any number of sides that would enable placement of the second collar 62 fixedly therein. For example, the second collar 62 and the first cavity 54 may each include a cross-sectional shape that is a polygon and includes an equal number of sides. In some embodiments, the cross-sectional shape of the second collar 62 may include 10 sides, and the cross-sectional shape of the first cavity 54 may include 10 sides. In another example, the cross-sectional shape of one of the first cavity 54 and the second collar 62 may include more sides than the cross-sectional shape of the other of the first cavity 54 and the second collar 62, and the corners formed by the multiple sides of the second collar 62 nevertheless rest within the first cavity 54 while still fixing the second collar 62 at various rotational positions within the first cavity 54. In some embodiments, the second collar 62 and the first cavity 54 each include a polygonal shape having 3 to 30 sides.

In the illustrative embodiment, the second collar 62 is formed cylindrically and includes an outer circumferential surface 65, as shown in FIGS. 4-6. When arranged in the first cavity 54, the bottom of the second collar 62 may rest on the bottom surface 46B of the recess 46, although in embodiments in which the first cavity 54 includes a bottom surface, the bottom of the second collar 62 rests on that bottom surface.

The roller pin 70 is arranged on a top surface 62T of the second collar 62, as shown in FIGS. 4-7. In some embodiments, the roller pin 70 is adhered to or fastened to the top surface 62T, and in other embodiments, the roller pin 70 may be formed integrally with the second collar 62 such that the two components form a single monolithic component.

As can be seen in FIGS. 4-7, the roller pin 70 is arranged eccentrically on the top surface 62T of the second collar 62. In other words, a central axis 70C of the roller pin 70 is formed offset from a central axis 62C of the second collar 62, as shown in FIG. 5. In some embodiments, the second collar 62 is concentric with the first cavity 54 such that the central axis 62C is aligned with the central axis 54C of the first cavity. As result of the eccentricity of the positioning of the roller pin 70, the second collar 52 includes a radial thickness (measured in the radial direction of the second collar 62 from the outer circumferential surface 65 to the outer circumferential boundary 63 of the roller pin 70, as extending imaginarily into the second collar 62 as shown in FIG. 5) that is largest at line 66, and smallest at line 67.

The roller pin 70 can include a central cylindrical shaft 72 that extends radially away from the second collar 62, as shown in FIGS. 4-6. As described above, the roller pin 70 can also include a roller pin head 80 affixed to a radially outer end of the cylindrical shaft 72. The pin head 80 is configured to be slidably arranged within the slots 93, 94, 95, 96 of the cam plate 91 for movement therein. The cylindrical shaft 72 may be surrounded by a shaft collar 74 having an annular lip 75 on a radially outer end of the collar 74. The lip 75 can support an annular head cover 84 that defines the roller head 80, as shown in FIG. 4. The cover 84 may include an inner annular ridge 85 that extends radially inward relative to the annular head cover 84 that rests on a radially top surface of the lip 75. A space 86 may be defined between the ridge 85 and the radially top of the shaft 72 so as to allow for some radial play between the cover 84 and the shaft 72.

As can be seen in FIGS. 4, 6, and 7, the second collar 62 is fixed relative to the first cavity 54 when arranged within the first cavity 54. In particular, the outer circumferential surface 65 of the second collar 62 includes a second plurality of spline teeth 68 formed thereon that extend radially outwardly relative to the central axis 62C of the second collar 62. The second plurality of spline teeth 68 are sized and shaped to engage with the second plurality of spline grooves 59 formed on the inner circumferential surface 53 of the first collar 52 when the second collar 62 is arranged within the first cavity 54 so as to fix the second collar 62 in a rotational position relative to the first cavity 54. In some embodiments, the circumferentially inner surface 53 on which the spline grooves 59 are formed may be considered part of the first cavity 54. The top bracket 48 of the base plate 42 can extend over the radial top surface 62T of the second collar 62, as well as the first collar 52, to secure the second collar 62 in the first cavity 54.

Illustratively, the second collar 62 includes 32 spline teeth 68 formed on the outer circumferential surface 65, as shown in FIG. 7. The spline grooves 59 formed in the first collar 52 are spaced apart so as to match the spacing of the spline teeth 58, and the first collar 52 may include 32 grooves 59 to match the 32 spline teeth 68. In some embodiments, the second collar 62 can include any number of spline teeth 68, where more spline teeth 68 allow for the second collar 62 to be arranged at more discrete rotational positions within the first cavity 54 than less spline teeth 68. In some embodiments, the second collar 62 may include a range of 2 to 180 spline teeth 68, and more particularly, a range of 2 to 90 spline teeth 68, and more particularly, 2 to 45 spline teeth 68, and more particularly, 2 to 30 spline teeth 68. In some embodiments, the second collar 62 can include spline teeth 68 around an entirety of the outer circumferential surface 65, as shown in FIGS. 4, 5, and 7. In some embodiments, the spline teeth 68 may be spaced apart around the outer circumferential surface 65, or may be formed in groups around the outer circumferential surface 65.

In operation, the first collar 52 is configured to be selectively arranged at a plurality of rotational positions within the recess 46 and the second collar 62 is configured to be selectively arranged at a plurality of rotational positions within the first cylindrical cavity 54 of the first collar 52. In particular, the second collar 62, along with the attached roller pin 70, is configured to be removed from and reinserted into the first cavity 54 of the first collar 52, and similarly, the first collar 52 is configured to be removed from and reinserted into the recess 46 of the base plate 42. In this way, the first collar 52 can be arranged at a plurality of rotational positions within the recess 46, in particular, for example, at one of the 30 spline teeth 58 positions. Similarly, the second collar 62 can be arranged at a plurality of rotational positions within the first cavity 54, in particular, for example, at one of the 32 spline teeth 68 positions.

Due to the eccentricity of the first cavity 54 relative to the recess 46 (or in other words, the eccentricity of the first cavity 54 relative to the outer surface 53 of the first collar 52) and the eccentricity of the roller pin 70 arrangement on the second collar 62, the roller pin 70 can be positioned at a plurality of distinct roller pin positions each corresponding to a rotational position of the first collar 52 and a rotational position of the second collar 62. In addition to the movement of the roller pin 70 within the cam plate 91 having an effect on the position of the annular ring 30, the roller pin 70 position may be even further fine-tuned by selectively arranging the first and second collars 52, 62 within the recess 46 and first cavity 54 to achieve a precise desired roller pin position 70.

Figure 8A:
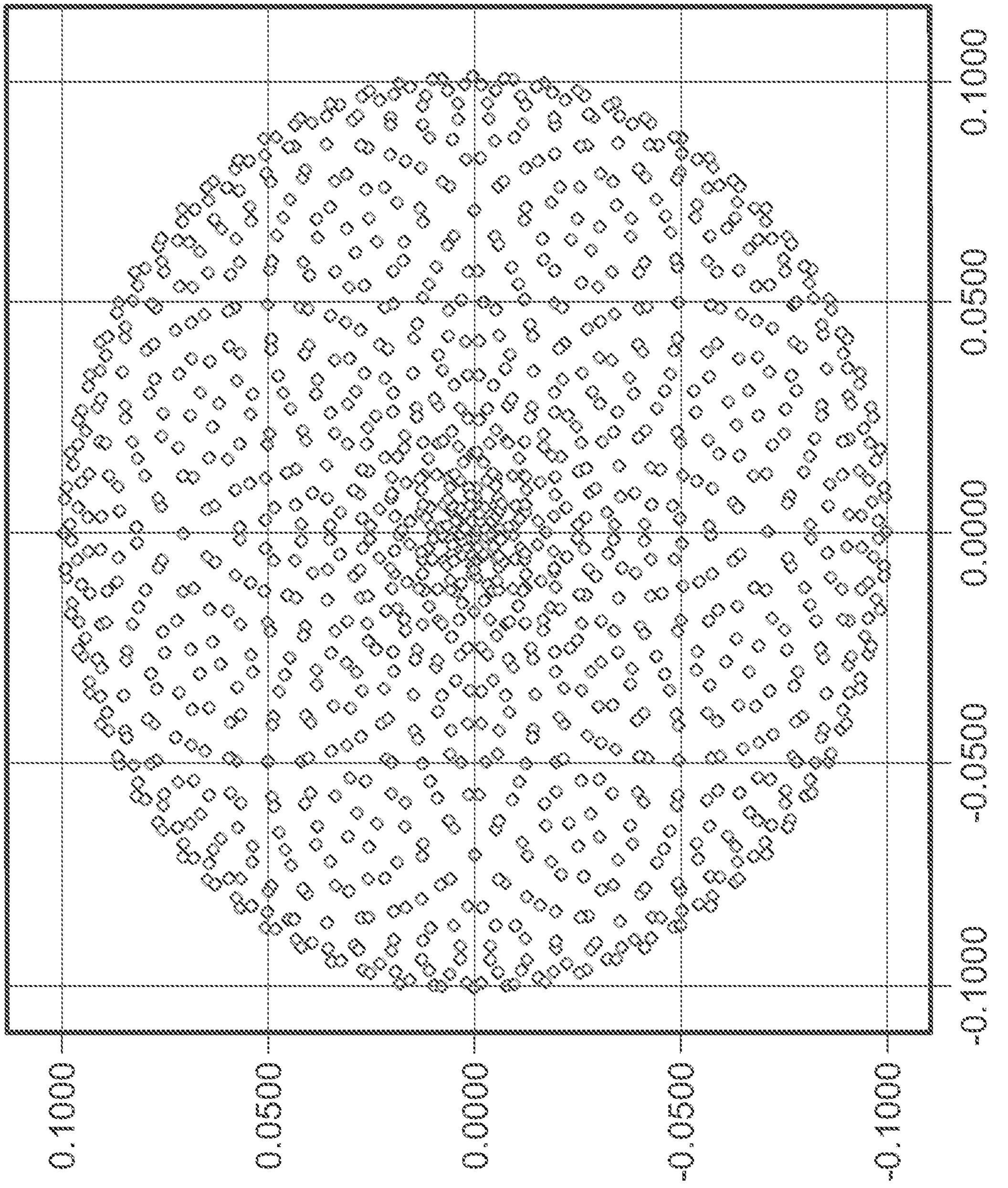
FIG. 8A is a graph showing an example of discrete positions of the roller pin of the vane adjustment assembly of FIG. 2 based on the rotational positioning of the first and second collars.

For example, for an offset of approximately 0.05 inches, the roller pin 70 may be positioned at any one of the discrete roller positions shown in FIG. 8A. In practice, an operator or designer may perform a tolerance stack between the roller pin 70 and the plate 91 to find a worst case radial position of the roller pin 70 relative to a datum position on the plate 91. Ideally, the sum of the two offsets would be greater than or equal to this worst case position relative to the datum, i.e. the offset of the first cavity 54 relative to the first collar 52 plus the offset of the roller pin 70 relative to the second collar 62 should be greater than or equal to an assembly tolerance (or "worst case position").

Figure 8B:
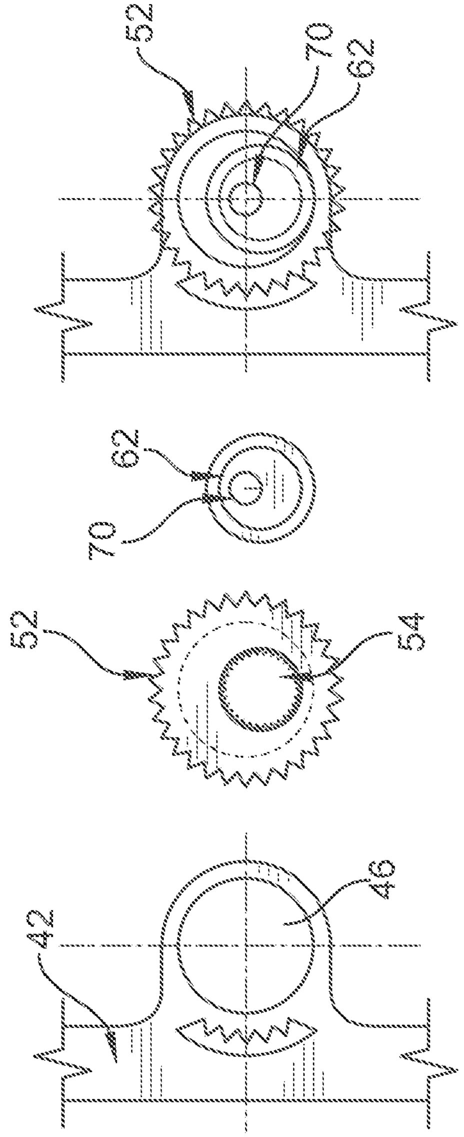
FIG. 8B is an exemplary position of the roller pin of the vane adjustment assembly of FIG. 2 based on the rotational positioning of the first and second collars.
Figure 8D:
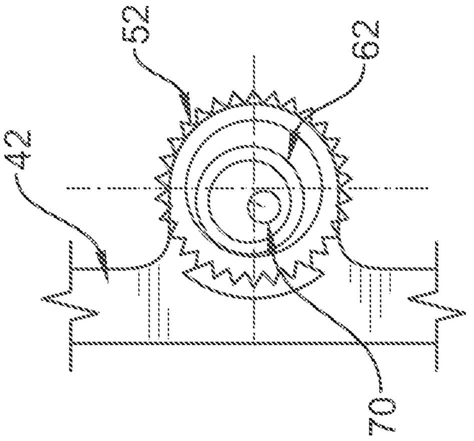
FIG. 8D is a further exemplary position of the roller pin of the vane adjustment assembly of FIG. 2 based on the rotational positioning of the first and second collars.
Figure 8C:
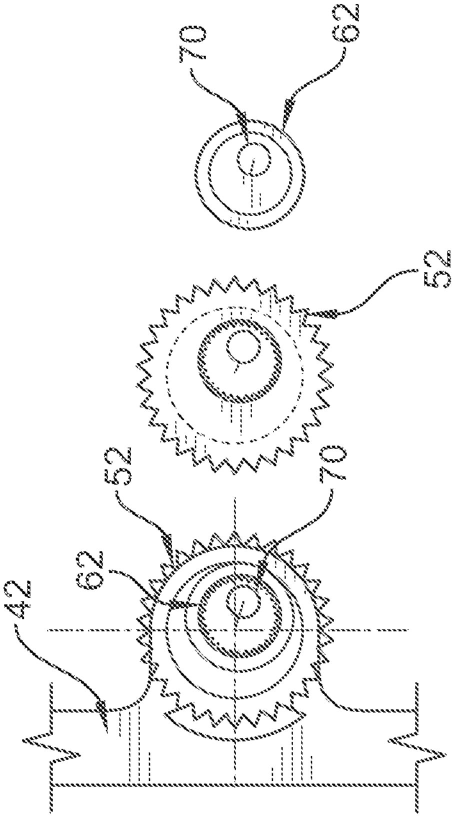
FIG. 8C is a further exemplary position of the roller pin of the vane adjustment assembly of FIG. 2 based on the rotational positioning of the first and second collars.

FIGS. 8B-8D show additional non-limiting examples of discrete roller positions of the roller pin 70 based on the rotational positions of the first and second collars 52, 62. The rotational positions shown in FIGS. 8B-8D may not correspond to the eccentricities shown in FIGS. 4-7, as the eccentric offsets of the first cavity 54 relative to the recess 46 and first collar 52 outer surface 53 and the roller pin 70 relative to the second collar 62 as shown in FIGS. 8B-8D are increased relative to those shown in FIGS. 4-7. For example, FIG. 8B shows the rotational positions of the first and second collars 62 such that the roller pin 70 remains centered within the recess 46. FIG. 8C shows the rotational positions of the first and second collars 62 such that the roller pin 70 is located in the lower right position when viewing FIG. 8C. FIG. 8D shows the rotational positions of the first and second collars 62 such that the roller pin 70 is located in the lower left position when viewing FIG. 8D.

According to the present disclosure, a method of adjusting a vane assembly of a gas turbine engine can include providing a plurality of vanes of the vane assembly, the plurality of vanes extending radially outward relative to a central axis of the gas turbine engine, arranging an annular ring radially outward of the central axis, and coupling the annular ring to the plurality of vanes. The method can further include coupling a base plate to the annular ring, the base plate having a recess formed in a radially outer surface of the base plate opposite the annular ring. The method can further include selectively and removably arranging a first collar that is cylindrical within the recess at a first rotational position therein, the first collar having a first cylindrical cavity formed therein and opening radially outwardly.

The method can further include fixedly coupling a roller pin to a radially outer surface of a second collar that is cylindrical, and selectively and removably arranging the second collar within the first cylindrical cavity of the first collar at a second rotational position therein so as to locate the roller pin at a first discrete roller pin position. A first central axis of the first cylindrical cavity is offset from a second central axis of the first collar and a third central axis of the roller pin is offset from a fourth central axis of the second collar, and the first collar is configured to be selectively arranged at a plurality of rotational positions including the first rotational position within the recess and the second collar is configured to be selectively arranged at a plurality of rotational positions including the second rotational position within the first cylindrical cavity of the first collar such that the roller pin is configured to be positioned at a plurality of distinct roller pin positions including the first discrete roller pin position each corresponding to a rotational position of the first collar and a rotational position of the second collar.

In some embodiments, the method can further include removing the first collar from the recess and reinserting the first collar in the recess at a third rotational position different than the first rotational position. In some embodiments, the method can further include removing the second collar from the first cylindrical cavity and reinserting the second collar in the first cylindrical cavity at a fourth rotational position different than the second rotational position.

Figure 9:
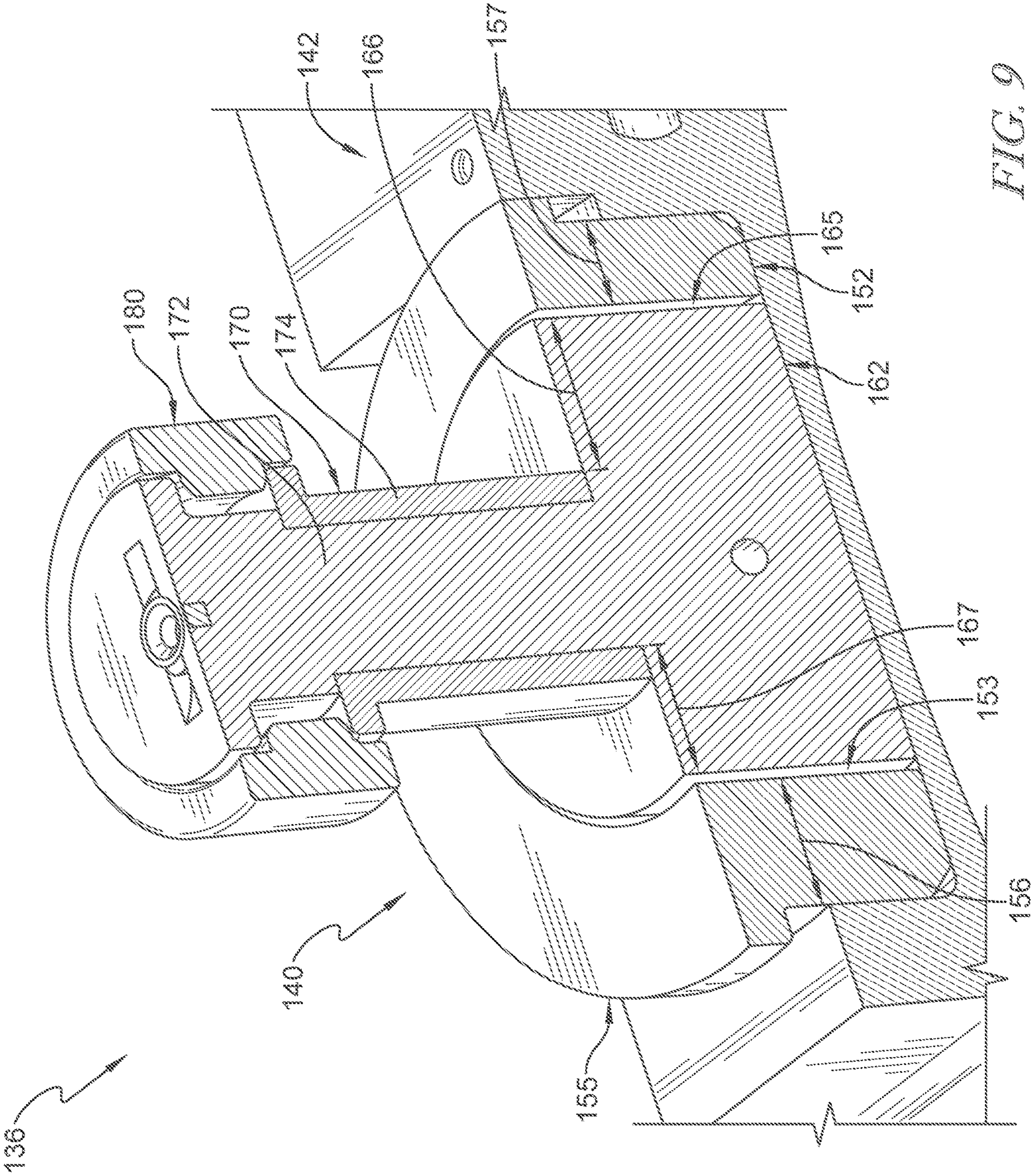
FIG. 9 is a perspective view of a vane adjustment assembly according to a further aspect of the present disclosure, showing that the assembly includes first and second collars that are held within the recess and cavity of the base plate and first collar via a tight interference fit, respectively, such that the roller pin can be positioned at distinct positions each corresponding to a rotational position of the first collar and a rotational position of the second collar.

Another embodiment of a vane adjustment assembly 136 that is configured to be utilized in the gas turbine engine 10 is shown in FIG. 9. The vane adjustment assembly 136 is similar to the vane adjustment assembly 36 described herein. Accordingly, similar reference numbers in the 100 series indicate features that are common between the vane adjustment assembly 136 and the vane adjustment assembly 36. The description of the vane adjustment assembly 36 is incorporated by reference to apply to the vane adjustment assembly 136, except in instances when it conflicts with the specific description and the drawings of the vane adjustment assembly 136.

The vane adjustment assembly 136 is configured similarly to the vane adjustment assembly 36, in particular to include a ring adjustment assembly 140 including a base plate 142, a first collar 152, a first cavity 154 formed in the first collar 152, a second collar 162, and a roller pin 170 arranged on the second collar 162. The first cavity 154 is formed eccentrically within the first collar 152. Similarly, the roller pin 170 is eccentrically arranged on the second collar 162.

As can be seen in FIG. 9, the recess 146 is formed to be cylindrical and the first cavity 154 is formed to be cylindrical as well. As a result, an inner circumferential surface defining the recess 146 substantially corresponds to an outer circumferential surface 155 of the first collar 152 such that the first collar 152 may be arranged at a plurality of rotational positions within the recess 146. In some embodiments, the recess 146 may also be referred to as a cylindrical cavity, as will be described in detail below. Similar to the recess 146, an inner circumferential surface 153 defining the first cylindrical cavity 154 substantially corresponds to an outer circumferential surface 165 of the second collar 162 such that the second collar 162 may be arranged at a plurality of rotational positions within the first cylindrical cavity 154.

The ring adjustment assembly 140 differs from the ring adjustment assembly 40 described above in that the first and second collars 152, 162 do not include spline teeth. Instead, the first collar 152 is arranged within the recess 146, or cylindrical cavity 146, with an interference fit such that the first collar 152 is securely held within the recess 146 when arranged therein. Similarly, the second collar 162 is arranged within the first cylindrical cavity 154, also referred to as a second cylindrical cavity in some embodiments, with an interference fit such that the second collar 162 is securely held within the first cylindrical cavity 154 when arranged therein. The lack of spline teeth enables the allows the first and second collars 152, 162 to be arranged at an infinite number of rotational positions within the recess 146 and first cavity 154, respectively.

Figure 10:
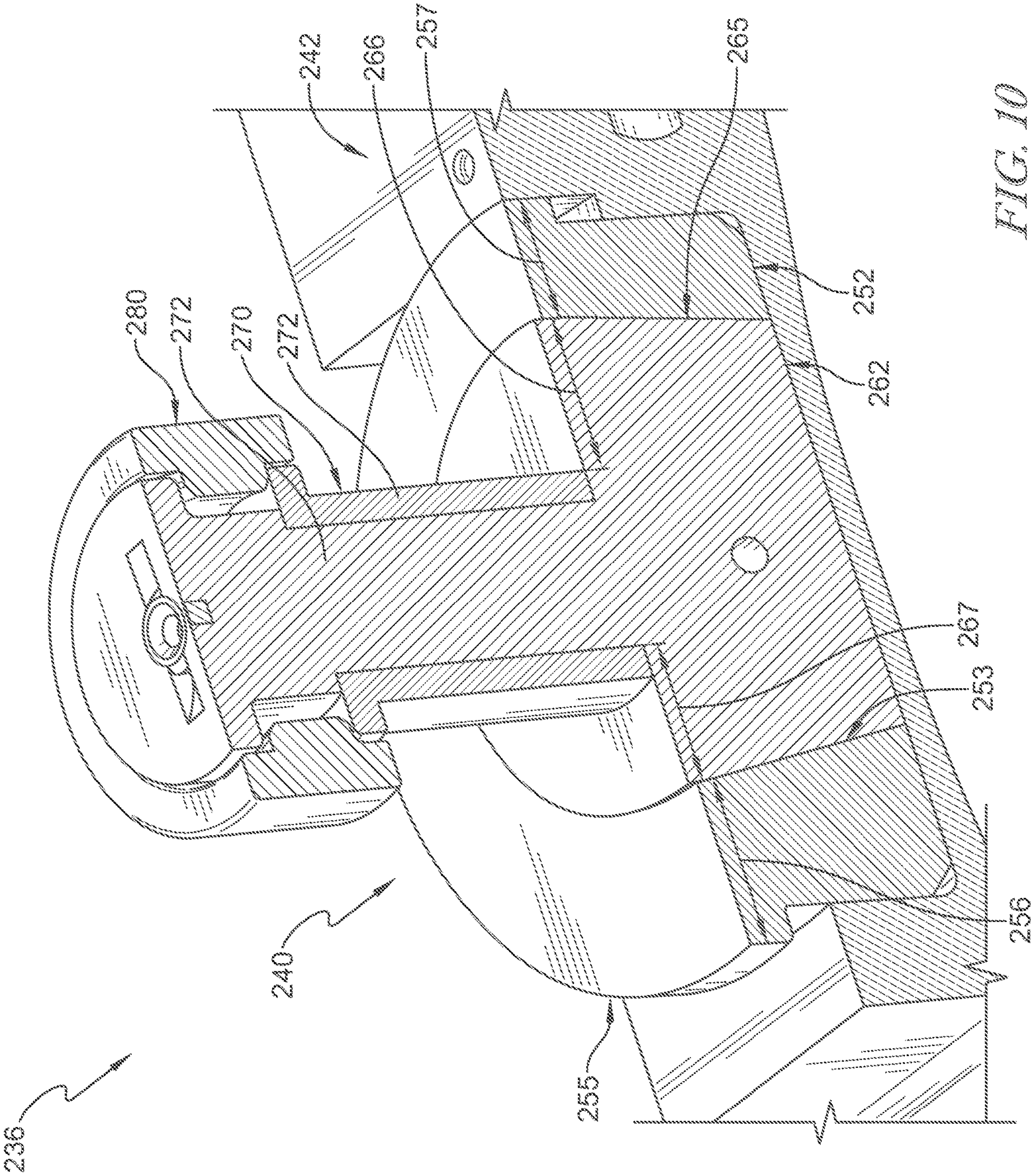
FIG. 10 is a perspective view of a vane adjustment assembly according to a further aspect of the present disclosure, showing that the assembly includes first and second collars that are held within the recess and cavity of the base plate and first collar via a tight interference fit, respectively, such that the roller pin can be positioned at distinct positions each corresponding to a rotational position of the first collar and a rotational position of the second collar; and showing that the second collar has a sloped outer circumferential surface and the cavity includes a corresponding sloped inner circumferential surface configured such that downward force on the second collar secures the second collar in the cavity.

Another embodiment of a vane adjustment assembly 236 that is configured to be utilized in the gas turbine engine 10 is shown in FIG. 10. The vane adjustment assembly 236 is similar to the vane adjustment assemblies 36, 136 described herein. Accordingly, similar reference numbers in the 200 series indicate features that are common between the vane adjustment assembly 236 and the vane adjustment assemblies 36, 136. The description of the vane adjustment assemblies 36, 136 are incorporated by reference to apply to the vane adjustment assembly 236, except in instances when they conflict with the specific description and the drawings of the vane adjustment assembly 236.

The vane adjustment assembly 236 is configured similarly to the vane adjustment assemblies 36, 136, in particular to include a ring adjustment assembly 240 including a base plate 242, a first collar 252, a first cavity 254 formed in the first collar 252, a second collar 262, and a roller pin 270 arranged on the second collar 262. The first cavity 254 is formed eccentrically within the first collar 252. Similarly, the roller pin 270 is eccentrically arranged on the second collar 262.

As can be seen in FIG. 10, the recess 246 is formed to be cylindrical and the first cavity 254 is formed to be cylindrical as well. As a result, an inner circumferential surface defining the recess 246 substantially corresponds to an outer circumferential surface 255 of the first collar 252 such that the first collar 252 may be arranged at a plurality of rotational positions within the recess 246. In some embodiments, the recess 246 may also be referred to as a cylindrical cavity, as will be described in detail below. Similar to the recess 246, an inner circumferential surface 253 defining the first cylindrical cavity 254 substantially corresponds to an outer circumferential surface 265 of the second collar 262 such that the second collar 262 may be arranged at a plurality of rotational positions within the first cylindrical cavity 254.

The ring adjustment assembly 240 differs from the ring adjustment assembly 40 described above in that the first and second collars 252, 262 do not include spline teeth. Instead, the first collar 252 is arranged within the recess 246, or cylindrical cavity 246, with an interference fit such that the first collar 252 is securely held within the recess 246 when arranged therein. The lack of spline teeth enables the allows the first and second collars 252, 262 to be arranged at an infinite number of rotational positions within the recess 246 and first cavity 254, respectively.

Moreover, the inner circumferential surface 253 defining the first cavity 254 is tapered in a radial direction of the annular ring 30 such that a diameter of the first cavity 254 at a radially outermost side of the first cavity 254 is larger than a diameter of the first cavity 254 at a radially innermost side of the first cavity 254, as shown in FIG. 10. Similarly, the outer circumferential surface 265 of the second collar 262 is tapered such that a diameter of the second collar 262 at a radially outermost side of the second collar 262 is larger than a diameter of the second collar 262 at a radially innermost side of the second collar 262. The tapered inner circumferential surface 253 of the first cavity 254 and the tapered outer circumferential surface 265 of the second collar 262 cause a retention force of the first cavity 254 on the second collar 262 to increase the further radially inwardly the second collar 262 is arranged within the first cavity 254.

Figure 11:
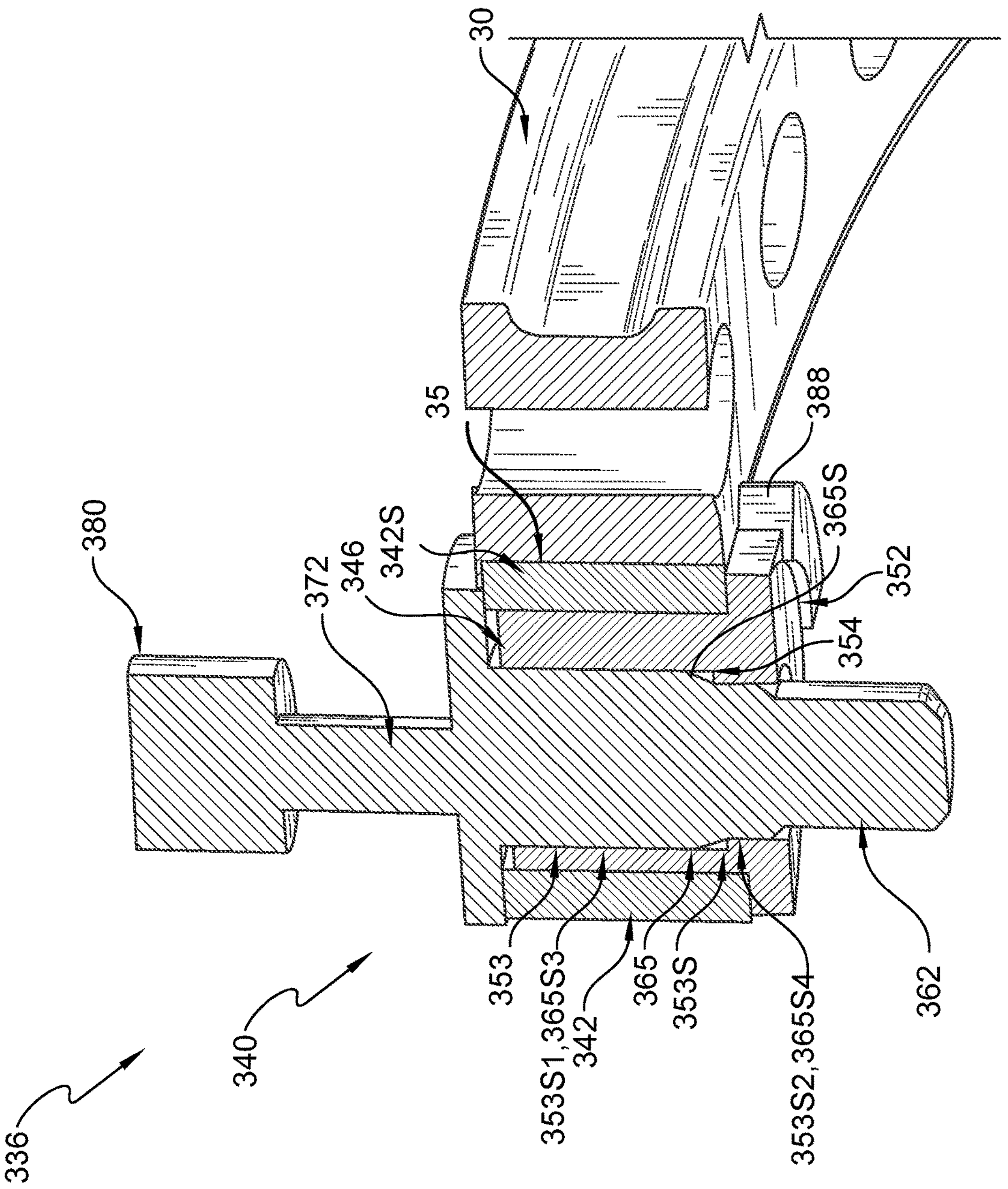
FIG. 11 is a perspective view of a vane adjustment assembly according to a further aspect of the present disclosure, showing that the assembly includes first and second collars arranged within a first cavity and a second cavity of a base frame and the first collar, respectively, such that the roller pin can be positioned at distinct positions each corresponding to a rotational position of the first collar and a rotational position of the second collar; and showing that the base frame is mounted on the annular ring and includes a support body extending axially away from the annular ring.

Another embodiment of a vane adjustment assembly 336 that is configured to be utilized in the gas turbine engine 10 is shown in FIG. 11. The vane adjustment assembly 336 is similar to the vane adjustment assemblies 36, 136, 236 described herein. Accordingly, similar reference numbers in the 300 series indicate features that are common between the vane adjustment assembly 336 and the vane adjustment assemblies 36, 136, 236. The description of the vane adjustment assemblies 36, 136, 236 are incorporated by reference to apply to the vane adjustment assembly 336, except in instances when they conflict with the specific description and the drawings of the vane adjustment assembly 336.

The vane adjustment assembly 336 is configured similarly to the vane adjustment assemblies 36, 136, 236, in particular to include a ring adjustment assembly 340 including a base plate 342, a first collar 352, a first cavity 354 formed in the first collar 352, a second collar 362, and a roller pin 370 arranged on the second collar 362. The first cavity 354 is formed eccentrically within the first collar 352. Similarly, the roller pin 370 is eccentrically arranged on the second collar 362. In some embodiments, the second collar 362 can extend through a lower opening of the cavity 354 if the cavity 354 is formed to not include a bottom surface.

The ring adjustment assembly 340 differs from the ring adjustment assemblies 40, 140, 240 described above in that the base plate 342 is formed as a base frame 342. In particular, as illustratively shown in FIG. 11, the base frame 342 is mounted on the annular ring 30 and includes a support body 342S extending axially away from an axially facing surface 35 of the annular ring 30. The support body 342S includes a first cylindrical cavity 346 formed therethrough, the cavity 346 being utilized instead of the recess 46, 146, 246 described above. The cavity 346 extends radially and is offset axially from the annular ring 30, as shown in FIG. 11. Due to the cavity 346 being considered a cavity, the cavity 354 formed in the first collar 352 may be considered a second cylindrical cavity 354 in such embodiments. In some embodiments in which the cavity 346 is entirely open (i.e. open on a radially bottom side of the cavity 354), the first collar 352 may be arranged from a bottom open side of the cavity 354 and secured in place via a collar retainer 388.

In some embodiments, the inner circumferential surface 353 defining the second cylindrical cavity 354 of the first collar 352 includes at least one first step 353S such that the inner circumferential surface 353 includes a first stepped portion 353S1 and a second stepped portion 353S2 having a smaller diameter than the first stepped portion 353S1, as shown in FIG. 11. Similarly, the outer circumferential surface 365 of the second collar 362 includes at least one second step 365S such that the outer circumferential surface 365 includes a third stepped portion 365S3 corresponding to the first stepped portion 353S1 and a fourth stepped portion 365S4 corresponding to the second stepped portion 353S2 and having a smaller diameter than the third stepped portion 365S3. As such, the steps 353S, 365S can provide additional support for retaining the second collar 362 in place within the cavity 354.

Figure 12:
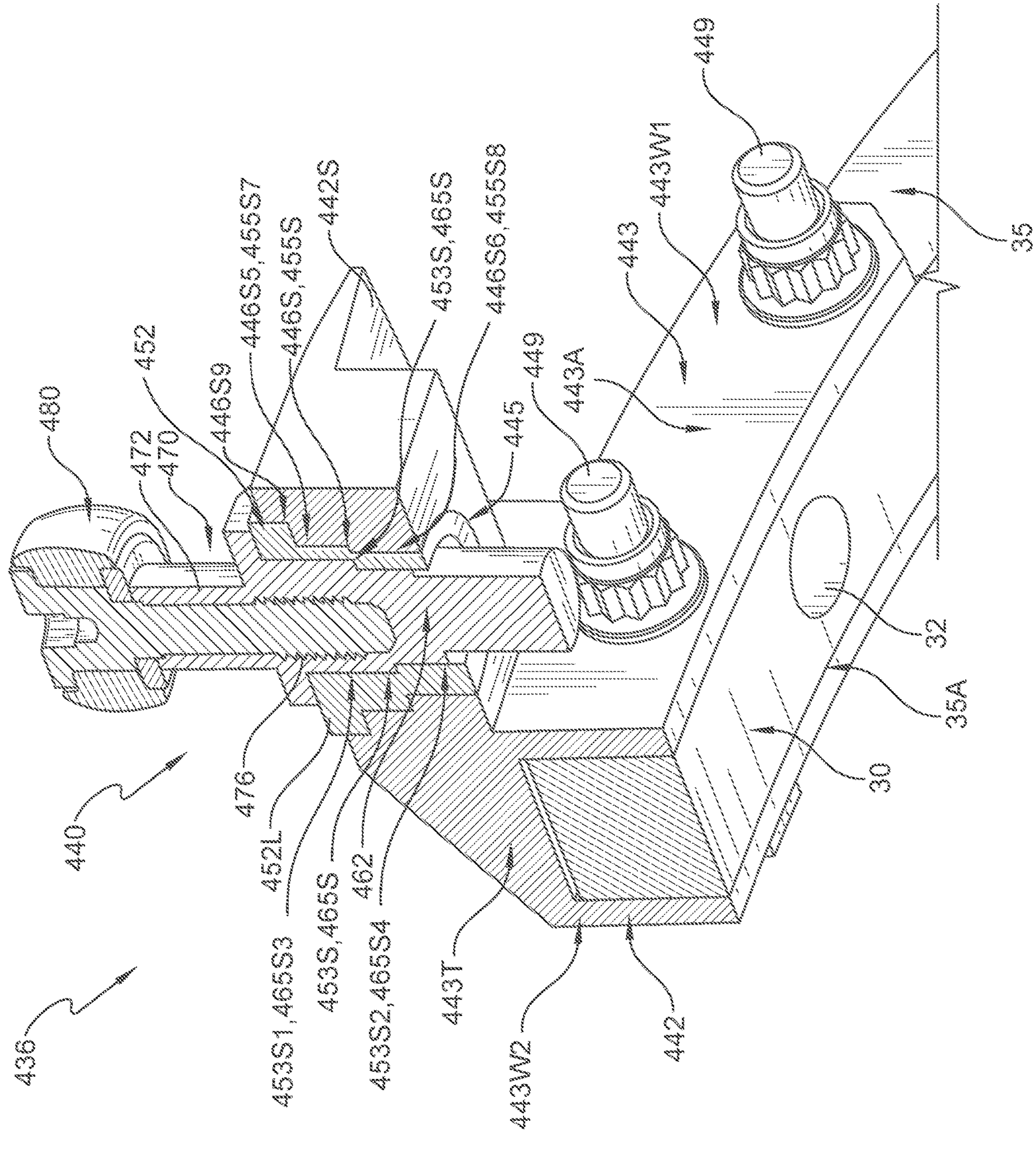
FIG. 12 is a perspective view of a vane adjustment assembly according to a further aspect of the present disclosure, showing that the assembly includes first and second collars having stepped outer circumferential surfaces arranged within a first cavity and a second cavity of a base frame and the first collar, respectively, such that the roller pin can be positioned at distinct positions each corresponding to a rotational position of the first collar and a rotational position of the second collar; and showing that the base frame is mounted on the annular ring and includes a support body extending axially away from the annular ring.

Another embodiment of a vane adjustment assembly 436 that is configured to be utilized in the gas turbine engine 10 is shown in FIG. 12. The vane adjustment assembly 436 is similar to the vane adjustment assemblies 36, 136, 236, 336 described herein. Accordingly, similar reference numbers in the 400 series indicate features that are common between the vane adjustment assembly 436 and the vane adjustment assemblies 36, 136, 236, 336. The description of the vane adjustment assemblies 36, 136, 236, 336 are incorporated by reference to apply to the vane adjustment assembly 436, except in instances when they conflict with the specific description and the drawings of the vane adjustment assembly 436.

The vane adjustment assembly 436 is configured similarly to the vane adjustment assemblies 36, 136, 236, 336 in particular to include a ring adjustment assembly 440 including a base plate 442, a first collar 452, a first cavity 454 formed in the first collar 452, a second collar 462, and a roller pin 470 arranged on the second collar 462. The first cavity 454 is formed eccentrically within the first collar 452. Similarly, the roller pin 470 is eccentrically arranged on the second collar 462. In some embodiments, the second collar 462 can extend through a lower opening of the cavity 454 if the cavity 454 is formed to not include a bottom surface.

The ring adjustment assembly 440 differs from the ring adjustment assemblies 40, 140, 240, 340 described above in that the base plate 442 is formed as a base frame 442. In particular, as illustratively shown in FIG. 12, the base frame 442 is mounted on the annular ring 30 and includes a support body 442S extending axially away from an axially facing surface 35 of the annular ring 30. The support body 442S includes a first cylindrical cavity 446 formed therethrough, the cavity 446 being utilized instead of the recess 46, 146, 246 described above. The cavity 446 extends radially and is offset axially from the annular ring 30, as shown in FIG. 12. Due to the cavity 446 being considered a cavity, the cavity 454 formed in the first collar 452 may be considered a second cylindrical cavity 454 in such embodiments.

In some embodiments, the base frame 442 may include a bracket 443 that is fixedly mounted on the annular ring 30, as shown in FIG. 12. The bracket 443 may include a first wall 443W1 arranged on the axially facing surface 35 of the annular ring 30 and a second wall 443W2 arranged on the opposite axially facing surface 35A. Fasteners 449 may be inserted through the first and second walls 443W1, 443W2 to couple the bracket 443 to the annular ring 30. The bracket 443 may further include a transition portion 443T that extends radially and axially from the walls 443W1, 443W2 to the support body 442S. The support body 442S may be both axially offset and radially offset from the annular ring 30, as shown in FIG. 12. In some embodiments, the support body 442S of the base frame 442 extends away from a first axially facing surface 443A of the bracket 443.

In some embodiments, the inner circumferential surface 453 defining the second cylindrical cavity 454 of the first collar 452 includes at least one first step 453S such that the inner circumferential surface 453 includes a first stepped portion 453S1 and a second stepped portion 453S2 having a smaller diameter than the first stepped portion 453S1, as shown in FIG. 12. Similarly, the outer circumferential surface 465 of the second collar 462 includes at least one second step 465S such that the outer circumferential surface 465 includes a third stepped portion 465S3 corresponding to the first stepped portion 453S1 and a fourth stepped portion 465S4 corresponding to the second stepped portion 453S2 and having a smaller diameter than the third stepped portion 465S3. As such, the steps 453S, 465S can provide additional support for retaining the second collar 462 in place within the cavity 454.

Similarly, the inner circumferential surface defining the first cylindrical cavity 446, or recess 446 in some embodiments, includes at least one third step 446S such that the inner circumferential surface includes a fifth stepped portion 446S5 and a sixth stepped portion 446S6 having a smaller diameter than the fifth stepped portion 446S5, as shown in FIG. 12. The outer circumferential surface 455 of the first collar 452 includes at least one fourth step **455*s* such that the outer circumferential surface 455 includes a seventh stepped portion 455S7 corresponding to the fifth stepped portion 446S5 and an eighth stepped portion 455S8 corresponding to the sixth stepped portion 446S6 and having a smaller diameter than the seventh stepped portion 455S7. As such, the steps 446S, 455S can provide additional support for retaining the first collar 452 in place within the cavity 446**.

A method of adjusting a vane assembly of a gas turbine engine according to the present disclosure includes providing a plurality of vanes of the vane assembly, the plurality of vanes extending radially outward relative to a central axis of the gas turbine engine, arranging an annular ring radially outward of the central axis, and coupling the annular ring to the plurality of vanes. The method can further include mounting a base frame on the annular ring, the base frame including a support body extending axially away from the annular ring, the support body having a first cylindrical cavity formed therethrough that extends radially and that is offset axially from the annular ring.

The method can further include selectively and removably arranging a first collar that is cylindrical within the first cylindrical cavity at a first rotational position therein, the first collar having a first cylindrical cavity formed therein and opening radially outwardly. The method can further include fixedly coupling a roller pin to a radially outer surface of a second collar that is cylindrical, and selectively and removably arranging the second collar within the second cylindrical cavity of the first collar at a second rotational position therein so as to locate the roller pin at a first discrete roller pin position. A first central axis of the first cylindrical cavity is offset from a second central axis of the first collar and a third central axis of the roller pin is offset from a fourth central axis of the second collar, and the first collar is configured to be selectively arranged at a plurality of rotational positions including the first rotational position within the first cylindrical cavity and the second collar is configured to be selectively arranged at a plurality of rotational positions including the second rotational position within the second cylindrical cavity of the first collar such that the roller pin is configured to be positioned at a plurality of distinct roller pin positions including the first discrete roller pin position each corresponding to a rotational position of the first collar and a rotational position of the second collar.

In some embodiments, the method can further include removing the first collar from the first cylindrical cavity and reinserting the first collar in the first cylindrical cavity at a third rotational position different than the first rotational position. In some embodiments, the method can further include removing the second collar from the second cylindrical cavity and reinserting the second collar in the second cylindrical cavity at a fourth rotational position different than the second rotational position.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane adjustment assembly for a gas turbine engine, comprising a plurality of vanes extending radially outward relative to a central axis of the gas turbine engine, an annular ring arranged radially outward of the central axis and coupled to the plurality of vanes, and a ring adjustment assembly including (i) a base frame mounted on the annular ring and including a support body extending axially away from the annular ring, the support body having a first cylindrical cavity formed therethrough that extends radially and that is offset axially from the annular ring, (ii) a first collar that is cylindrical and removably arranged within the first cylindrical cavity, the first collar having a second cylindrical cavity formed therein and opening radially outwardly, (iii) a second collar that is cylindrical and removably arranged within the second cylindrical cavity of the first collar, and (iv) a roller pin fixedly coupled to a radially outer surface of the second collar, wherein a first central axis of the second cylindrical cavity is offset from a second central axis of the first collar and a third central axis of the roller pin is offset from a fourth central axis of the second collar, and wherein the first collar is configured to be selectively arranged at a plurality of rotational positions within the first cylindrical cavity and the second collar is configured to be selectively arranged at a plurality of rotational positions within the second cylindrical cavity of the first collar such that the roller pin is configured to be positioned at a plurality of distinct roller pin positions each corresponding to a rotational position of the first collar and a rotational position of the second collar.

2. The vane adjustment assembly of claim 1, wherein the first collar is fixed relative to the first cylindrical cavity when arranged within the first cylindrical cavity, and wherein the second collar is fixed relative to the second cylindrical cavity of the first collar when the second collar is arranged within the second cylindrical cavity.

3. The vane adjustment assembly of claim 2, wherein the first cylindrical cavity is cylindrical, wherein an inner circumferential surface defining the first cylindrical cavity corresponds to an outer circumferential surface of the first collar such that the first collar may be arranged at the plurality of rotational positions within the first cylindrical cavity, and wherein an inner circumferential surface defining the second cylindrical cavity corresponds to an outer circumferential surface of the second collar such that the second collar may be arranged at the plurality of rotational positions within the second cylindrical cavity.

4. The vane adjustment assembly of claim 3, wherein the first collar is arranged within the first cylindrical cavity with an interference fit such that the first collar is securely held within the first cylindrical cavity.

5. The vane adjustment assembly of claim 4, wherein the second collar is arranged within the second cylindrical cavity with an interference fit such that the second collar is securely held within the second cylindrical cavity.

6. The vane adjustment assembly of claim 3, wherein the inner circumferential surface defining the second cylindrical cavity is tapered in a radial direction of the annular ring such that a diameter of the second cylindrical cavity at a radially outermost side of the second cylindrical cavity is larger than a diameter of the second cylindrical cavity at a radially innermost side of the second cylindrical cavity, and wherein the outer circumferential surface of the second collar is tapered such that a diameter of the second collar at a radially outermost side of the second collar is larger than a diameter of the second collar at a radially innermost side of the second collar.

7. The vane adjustment assembly of claim 6, wherein the tapered inner circumferential surface of the second cylindrical cavity and the tapered outer circumferential surface of the second collar engage each other so as to cause a retention force that retains the second collar within the second cylindrical cavity, and wherein the retention force is inversely proportional to a distance between a bottom surface of the second collar and a bottom surface of the second cylindrical cavity.

8. The vane adjustment assembly of claim 3, wherein the inner circumferential surface defining the second cylindrical cavity includes at least one first step such that the inner circumferential surface includes a first stepped portion and a second stepped portion having a smaller diameter than the first stepped portion, and wherein the outer circumferential surface of the second collar includes at least one second step such that the outer circumferential surface includes a third stepped portion corresponding to the first stepped portion and a fourth stepped portion corresponding to the second stepped portion and having a smaller diameter than the third stepped portion.

9. The vane adjustment assembly of claim 8, wherein the inner circumferential surface defining the first cylindrical cavity includes at least one third step such that the inner circumferential surface includes a fifth stepped portion and a sixth stepped portion having a smaller diameter than the fifth stepped portion, and wherein the outer circumferential surface of the first collar includes at least one fourth step such that the outer circumferential surface includes a seventh stepped portion corresponding to the fifth stepped portion and an eighth stepped portion corresponding to the sixth stepped portion and having a smaller diameter than the seventh stepped portion.

10. The vane adjustment assembly of claim 2, wherein the support body of the base frame extends away from a first axially facing surface of the annular ring.

11. The vane adjustment assembly of claim 10, wherein the base frame includes a bracket that is fixedly mounted on the annular ring, and wherein the support body of the base frame extends away from a first axially facing surface of the bracket.

12. The vane adjustment assembly of claim 2, wherein the roller pin is selectively movably coupled to a casing of the gas turbine engine such that movement of the roller pin relative to the casing further adjusts a position of the annular ring relative to the casing, wherein the roller pin is selectively movably coupled to the casing via a cam plate that is slidably coupled to the casing and slidable relative to the casing, and wherein the cam plate includes at least one slot within which the roller pin is slidably arranged.

13. The vane adjustment assembly of claim 12, wherein sliding of the cam plate relative to the casing in an axial direction causes the roller pin to slidably move within the at least one slot and further adjusts the position of the annular ring relative to the casing, and wherein the roller pin includes a roller pin head configured to be slidably arranged within the at least one slot and engage with edges of the at least one slot.

14. A vane adjustment assembly for a gas turbine engine, comprising an annular ring arranged radially outward of a central axis of the gas turbine engine and coupled to a plurality of variable vanes, and a ring adjustment assembly including (i) a base frame mounted on the annular ring having a first cavity formed therethrough that is offset axially from the annular ring (ii) a first collar removably arranged within the first cavity formed in the annular ring, the first collar having a second cavity eccentrically formed therein, (iii) a second collar removably arranged within the second cavity of the first collar, and (iv) a roller pin eccentrically arranged on the second collar, wherein the first collar is configured to be selectively arranged at a plurality of rotational positions within the first cavity and the second collar is configured to be selectively arranged at a plurality of rotational positions within the second cavity of the first collar such that the roller pin is configured to be positioned at a plurality of distinct roller pin positions each corresponding to a rotational position of the first collar and a rotational position of the second collar.

15. The vane adjustment assembly of claim 14, wherein the first cavity is cylindrical, wherein an inner circumferential surface defining the first cavity corresponds to an outer circumferential surface of the first collar such that the first collar may be arranged at the plurality of rotational positions within the first cavity, and wherein an inner circumferential surface defining the second cavity corresponds to an outer circumferential surface of the second collar such that the second collar may be arranged at the plurality of rotational positions within the second cavity.

16. The vane adjustment assembly of claim 15, wherein the first collar is arranged within the first cavity with an interference fit such that the first collar is securely held within the first cavity, and wherein the second collar is arranged within the second cavity with an interference fit such that the second collar is securely held within the second cavity.

17. The vane adjustment assembly of claim 14, wherein an inner circumferential surface defining the second cavity is tapered in a radial direction of the annular ring such that a diameter of the second cavity at a radially outermost side of the second cavity is larger than a diameter of the second cavity at a radially innermost side of the second cavity, and wherein an outer circumferential surface of the second collar is tapered such that a diameter of the second collar at a radially outermost side of the second collar is larger than a diameter of the second collar at a radially innermost side of the second collar.

18. The vane adjustment assembly of claim 14, wherein the roller pin is selectively movably coupled to a casing of the gas turbine engine such that the plurality of distinct roller pin positions each corresponding to a rotational position of the first collar and a rotational position of the second collar each further correspond to distinct positions of the roller pin relative to the casing and distinct positions of the annular ring relative to the casing, wherein the roller pin is selectively movably coupled to the casing via a cam plate that is slidably coupled to the casing and slidable relative to the casing, and wherein the cam plate includes at least one slot within which the roller pin is slidably arranged.

19. A method of adjusting a vane assembly of a gas turbine engine, comprising providing a plurality of vanes of the vane assembly, the plurality of vanes extending radially outward relative to a central axis of the gas turbine engine, arranging an annular ring radially outward of the central axis, coupling the annular ring to the plurality of vanes, mounting a base frame on the annular ring, the base frame including a support body extending axially away from the annular ring, the support body having a first cylindrical cavity formed therethrough that extends radially and that is offset axially from the annular ring, selectively and removably arranging a first collar that is cylindrical within the first cylindrical cavity at a first rotational position therein, the first collar having a second cylindrical cavity formed therein and opening radially outwardly, fixedly coupling a roller pin to a radially outer surface of a second collar that is cylindrical, and selectively and removably arranging the second collar within the second cylindrical cavity of the first collar at a second rotational position therein so as to locate the roller pin at a first discrete roller pin position, wherein a first central axis of the first cylindrical cavity is offset from a second central axis of the first collar and a third central axis of the roller pin is offset from a fourth central axis of the second collar, and wherein the first collar is configured to be selectively arranged at a plurality of rotational positions including the first rotational position within the first cylindrical cavity and the second collar is configured to be selectively arranged at a plurality of rotational positions including the second rotational position within the second cylindrical cavity of the first collar such that the roller pin is configured to be positioned at a plurality of distinct roller pin positions including the first discrete roller pin position each corresponding to a rotational position of the first collar and a rotational position of the second collar.

* * * * *